US012619389B2

(12) United States Patent
Chen et al.

(10) Patent No.: US 12,619,389 B2
(45) Date of Patent: May 5, 2026

(54) SCREEN PROJECTION DISPLAY METHOD AND SYSTEM, TERMINAL DEVICE, AND STORAGE MEDIUM

(71) Applicant: Huawei Technologies Co., Ltd., Shenzhen (CN)

(72) Inventors: Guangjun Chen, Wuhan (CN); Bo Wang, Wuhan (CN); Pei Zhu, Wuhan (CN); Dinggeng Fang, Wuhan (CN); Ping Wen, Wuhan (CN); Tonggang Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/919,963

(22) PCT Filed: Apr. 20, 2021

(86) PCT No.: PCT/CN2021/088371
§ 371 (c)(1),
(2) Date: Oct. 19, 2022

(87) PCT Pub. No.: WO2021/213379
PCT Pub. Date: Oct. 28, 2021

(65) Prior Publication Data
US 2023/0176806 A1 Jun. 8, 2023

(30) Foreign Application Priority Data
Apr. 20, 2020 (CN) .......................... 202010312360.0

(51) Int. Cl.
*G06F 3/14* (2006.01)
*G06F 3/0481* (2022.01)
(Continued)

(52) U.S. Cl.
CPC .......... *G06F 3/1454* (2013.01); *G06F 3/0481* (2013.01); *G06F 3/1462* (2013.01);
(Continued)

(58) Field of Classification Search
CPC ...... G06F 3/1454; G06F 9/452; G06F 3/0481; G06F 3/1423; G06F 3/1462; G09G 5/14; H04N 21/4122; H04N 21/4126
See application file for complete search history.

(56) References Cited

U.S. PATENT DOCUMENTS

| | | | | |
|---|---|---|---|---|
| 11,150,861 B1 * | 10/2021 | Thomas | ................. | H04N 7/152 |
| 2005/0132299 A1 * | 6/2005 | Jones | .................... | G06F 3/0481 |
| | | | | 348/E7.083 |

(Continued)

FOREIGN PATENT DOCUMENTS

| | | |
|---|---|---|
| CN | 102841804 A | 12/2012 |
| CN | 103324435 A | 9/2013 |

(Continued)

*Primary Examiner* — Patrick F Riegler
(74) *Attorney, Agent, or Firm* — Slater Matsil, LLP

(57) ABSTRACT

The screen projection display method includes: After receiving screen projection request information sent by a source device, a target device obtains window data of an application enabled by the source device, where the window data includes display content corresponding to at least two windows opened in a same application enabled by the source device; and the target device displays the window data of the enabled application. The target device onto which a screen is to be projected obtains the window data of the application enabled by the source device. The window data not only includes content of a currently visible window on the source device, but also includes content of a window that is enabled by the source device but is invisible. The target device displays the window data on a display interface of the target device.

20 Claims, 12 Drawing Sheets

(51) Int. Cl.
    *G06F 9/451*        (2018.01)
    *H04N 21/41*      (2011.01)

(52) U.S. Cl.
    CPC ......... *G06F 9/452* (2018.02); *H04N 21/4122*
           (2013.01); *H04N 21/4126* (2013.01)

(56)            References Cited

U.S. PATENT DOCUMENTS

| | | | |
|---|---|---|---|
| 2007/0192329 A1 | 8/2007 | Croft et al. | |
| 2010/0138780 A1 | 6/2010 | Marano et al. | |
| 2010/0257450 A1* | 10/2010 | Go | G06F 3/1454 |
| | | | 715/788 |
| 2011/0083102 A1 | 4/2011 | Adachi | |
| 2013/0019183 A1* | 1/2013 | Reeves | G09G 5/14 |
| | | | 715/745 |
| 2013/0111371 A1* | 5/2013 | Reeves | G06F 3/04883 |
| | | | 715/761 |
| 2013/0148720 A1* | 6/2013 | Rabii | G06F 9/542 |
| | | | 375/E7.243 |
| 2013/0162502 A1* | 6/2013 | Lee | H04N 21/4363 |
| | | | 345/1.2 |
| 2013/0241803 A1 | 9/2013 | Kabyashi | |
| 2013/0278484 A1* | 10/2013 | Hwang | G06F 3/1423 |
| | | | 345/2.3 |
| 2015/0020013 A1 | 1/2015 | Kim et al. | |
| 2015/0061970 A1* | 3/2015 | Kim | G06F 3/1423 |
| | | | 345/2.3 |
| 2015/0065056 A1 | 3/2015 | Won et al. | |
| 2015/0205447 A1* | 7/2015 | Jia | G09G 5/14 |
| | | | 715/802 |
| 2015/0346929 A1* | 12/2015 | Karunamuni | G06F 3/0488 |
| | | | 715/777 |
| 2016/0124698 A1* | 5/2016 | Reeves | G06F 1/1632 |
| | | | 715/761 |
| 2016/0216850 A1 | 7/2016 | Ngai | |
| 2016/0231872 A1* | 8/2016 | Tamura | G06F 3/1454 |
| 2017/0017451 A1* | 1/2017 | Sathyanarayana Raghu | |
| | | | G06F 3/1454 |
| 2017/0235435 A1* | 8/2017 | Sohn | G06F 3/0481 |
| | | | 715/738 |
| 2019/0166330 A1* | 5/2019 | Ma | H04L 65/403 |
| 2020/0057596 A1* | 2/2020 | Kim | G06F 3/147 |
| 2021/0064402 A1* | 3/2021 | Jenks | G09G 5/14 |
| 2021/0149618 A1* | 5/2021 | Lee | G06F 3/16 |
| 2021/0181939 A1* | 6/2021 | Lee | G06F 3/04812 |
| 2022/0004315 A1* | 1/2022 | Zhang | G06F 3/04886 |
| 2022/0004350 A1* | 1/2022 | Reeves | H04M 1/72409 |
| 2022/0244902 A1* | 8/2022 | Dusad | G06F 3/0486 |
| 2024/0020074 A1* | 1/2024 | Chen | H04N 21/8173 |

FOREIGN PATENT DOCUMENTS

| | | | |
|---|---|---|---|
| CN | 103379221 A | 10/2013 | |
| CN | 104978156 A | 10/2015 | |
| CN | 105828139 A | 8/2016 | |
| CN | 106095237 A | 11/2016 | |
| CN | 107493375 A | 12/2017 | |
| CN | 109508162 A | 3/2019 | |
| CN | 109889885 A | 6/2019 | |
| CN | 110221798 A | 9/2019 | |
| CN | 110310638 A | 10/2019 | |
| CN | 110417992 A | 11/2019 | |
| CN | 110515576 A | 11/2019 | |
| JP | 2020027996 A | 2/2020 | |

* cited by examiner

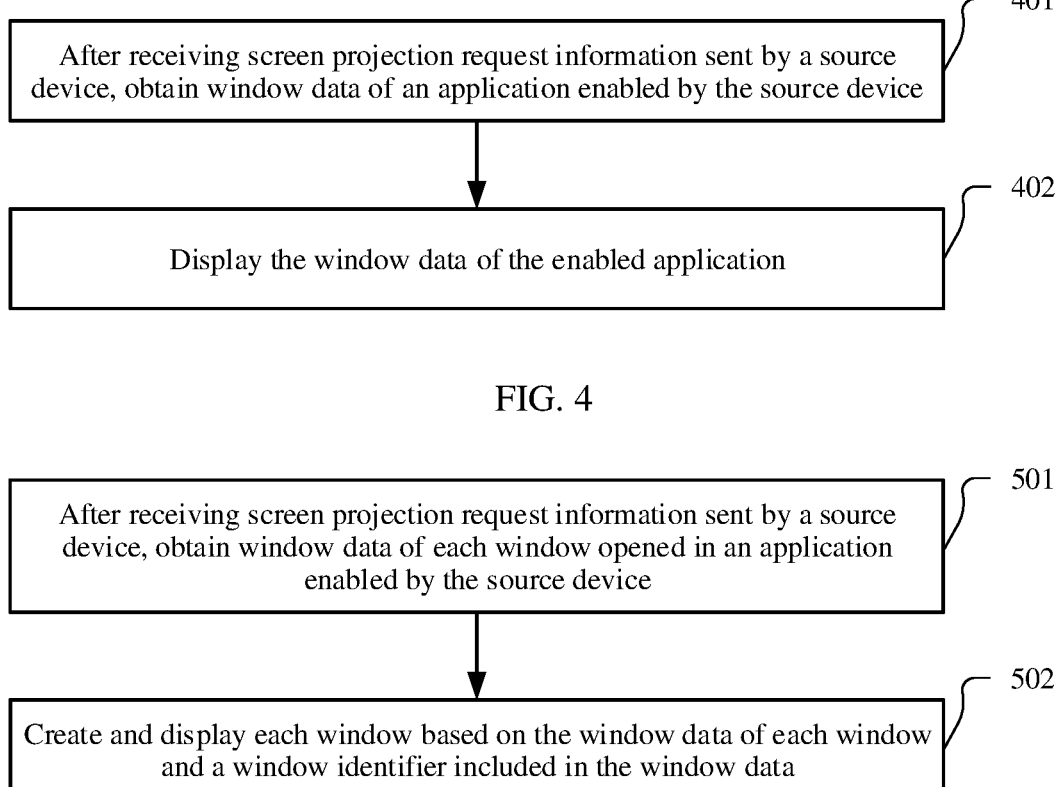

401

After receiving screen projection request information sent by a source device, obtain window data of an application enabled by the source device

402

Display the window data of the enabled application

After receiving screen projection request information sent by a source device, obtain window data of each window opened in an application enabled by the source device

502

Create and display each window based on the window data of each window and a window identifier included in the window data

FIG. 5

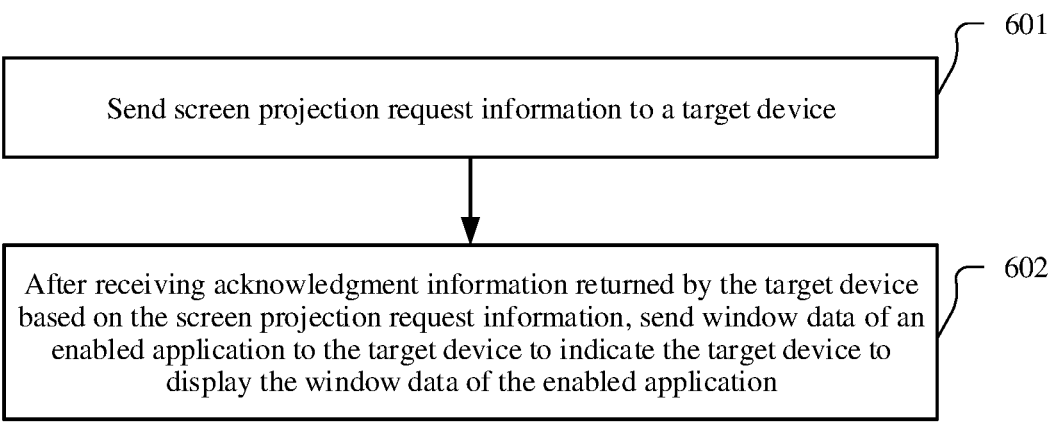

601

Send screen projection request information to a target device

602

After receiving acknowledgment information returned by the target device based on the screen projection request information, send window data of an enabled application to the target device to indicate the target device to display the window data of the enabled application

FIG. 6

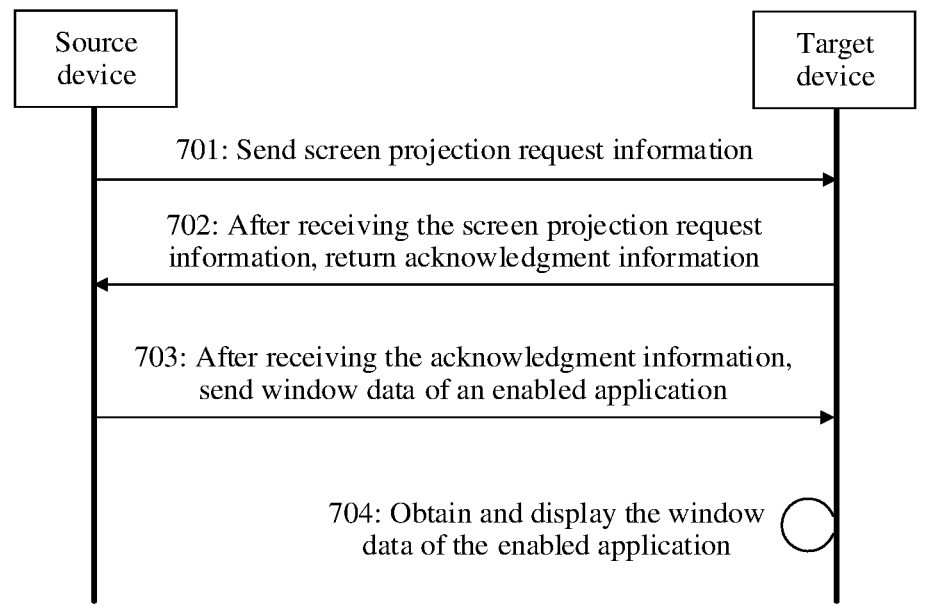

Source device

Target device

701: Send screen projection request information

702: After receiving the screen projection request information, return acknowledgment information 703: After receiving the acknowledgment information, send window data of an enabled application 704: Obtain and display the window data of the enabled application

FIG. 7

SCREEN PROJECTION DISPLAY METHOD AND SYSTEM, TERMINAL DEVICE, AND STORAGE MEDIUM

CROSS-REFERENCE TO RELATED APPLICATIONS

This application is a national stage of International Application No. PCT/CN2021/088371, filed on Apr. 20, 2021, which claims priority to Chinese Patent Application No. 202010312360.0, filed on Apr. 20, 2020. Both of the aforementioned applications are hereby incorporated by reference in their entireties.

TECHNICAL FIELD

This application belongs to the field of terminal control technologies, and in particular, to a screen projection display method and system, a terminal device, and a storage medium.

BACKGROUND

Screen projection display refers to a method for projecting content on a screen of a source device onto a screen of a target device for display. For example, a user may project an application window on a screen of a mobile phone onto a large-screen television for display, to obtain a clearer and more exquisite picture display effect.

Currently, screen projection software such as AirPlay and A powerMirror is usually used to implement screen projection display. However, all the screen projection software is used for screen projection based on content of a window that is on a source device and that is currently visible to a user, and cannot be used for projecting, onto a target device, content of a window that is enabled on the source device but is invisible.

SUMMARY

In view of this, embodiments of this application provide a screen projection display method and system, a terminal device, and a storage medium, to project content of an invisible window on a source device onto a target device for display.

According to a first aspect, an embodiment of this application provides a screen projection display method, applied to a target device onto which a screen is to be projected. The method includes:

after screen projection request information sent by a source device is received, obtaining window data of an application enabled by the source device, where the window data includes display content corresponding to at least two windows opened in the same application enabled by the source device; and displaying the window data of the enabled application.

In this embodiment of this application, the target device onto which a screen is to be projected obtains the window data of the application enabled by the source device. The window data not only includes content of a currently visible window on the source device, but also includes content of a window that is enabled by the source device but is invisible. The target device displays the window data on a display interface of the target device, to implement projection of the content of the invisible window on the source device onto the target device for display.

Further, the obtaining window data of an application enabled by the source device may include:

obtaining window data of each window opened in the application enabled by the source device, where a window component of each window is in an active state, a layer of each window component is in a visible state, and the window data of each window includes a corresponding window identifier; and the displaying the window data of the enabled application may include:

creating and displaying each window based on the window data of each window and the window identifier included in the window data.

Before screen projection display is performed, window components of windows that are in the application of the source device and that have run are preset to be in an active state, and layers of these window components are preset to be in a visible state. Then, the source device sends, to the target device, window data of these windows that have run (which may include a currently visible window on the source device and an invisible window running in a background). The target device can distinguish between window data of different windows based on the window identifiers included in all the window data, to create different windows. In addition, because the window components of these windows are activated and the layers thereof are visible, content of these windows can be displayed on the display interface of the target device, in other words, content of the invisible window on the source device is projected onto the target device for display.

Further, the windows include a first window and a second window, the first window is a window that is not currently displayed on the source device, the second window is a window currently displayed on the source device, and the displaying each window may include:

determining a first area and a second area from a display interface; and adding the first window to the first area for display, and adding the second window to the second area for display.

For example, windows to be displayed on the target device include a window A and a window B. The window A is a window that has run on the source device but is not currently displayed, and the window B is a window that is currently displayed on the source device. In this case, two areas, namely, a left area and a right area, may be determined from the display interface of the target device. Sizes of the two areas may be the same or different, and a size of each area may be the same as a screen size of the source device. Then, the window A is added to the left area for display, and the window B is added to the right area for display.

Further, after the adding the first window to the first area for display, and adding the second window to the second area for display, the method may further include:

if a third window opened from the first window is detected, adding the third window to the second area for display, and closing the second window; and if a fourth window opened from the second window is detected, adding the fourth window to the second area to cover the second window for display.

This manner belongs to a screen projection display manner in a navigation mode. The foregoing example is also used for description. If a new window C opened from the window A is detected (a user performs an operation on the window A on the display interface of the target device to open the window C), the window C is added to the right area for display, that is, covers the window B for display. After the window C is displayed, the system closes the window B. If a new window D opened from the window B is detected, the window D is added to the right area to cover the window B for stacked display.

Further, after the adding the first window to the first area for display, and adding the second window to the second area for display, the method may further include:

if a fifth window opened from the first window is detected, adding the fifth window to the second area for display, and closing the second window; and if a sixth window opened from the second window is detected, adding the sixth window to the second area for display, and moving the second window to the first area to cover the first window for display.

This manner belongs to a screen projection display method in a shopping mode. The foregoing example is also used for description. If a new window E opened from the window A is detected, the window E is added to the right area for display, that is, covers the window B for display. After the window E is displayed, the system closes the window B. If a new window F opened from the window B is detected, the window F is added to the right area (that is, an original location of the window B) for display, and the window B is moved to the left area to cover the window A for stacked display.

Further, the window data of each window further includes corresponding application information, window component information, and window attribute information, and the creating and displaying each window may include:

determining a quantity of to-be-displayed windows and a size, a display location, and a display manner of a to-be-displayed window based on the application information, the window component information, and the window attribute information that are included in the window data of each window; and creating and displaying the corresponding window on a display interface based on the quantity of to-be-displayed windows and the size, the display location, and the display manner of the to-be-displayed window.

After the application information, the window component information, and the window attribute information that are included in the window data of each window are obtained, the quantity of to-be-displayed windows and the size, the display location, and the display manner of the to-be-displayed window may be determined based on the information, and then the corresponding window is created and displayed on the display interface. How to determine an area on the display interface, a quantity of areas to be determined on the display interface, a size of a display window in each area, a window display manner, and the like may all be set based on the information.

Further, after the creating and displaying the corresponding window on a display interface, the method may further include:

if a first instruction for performing an operation on any created and displayed window is detected, obtaining target application information and target window component information that are included in window data of the any window; and sending the first instruction, the target application information, and the target window component information to the source device to instruct the source device to determine both a to-be-operated target application and a to-be-operated target window based on the target application information and the target window component information, and performing an operation on the target window in the target application according to the first instruction.

The target device may send, to the source device, the detected operation instruction and the target application information and the target window component information that are included in the window data of the corresponding window, so that the source device determines the target application and the target window that are corresponding to the operation instruction, and performs a corresponding operation on the target window in the target application. In general, an input event on the target device is sent to the source device through a cross-device channel, and the source device simulates the identical event and sends the event to a corresponding window in an application for execution.

Further, after the creating and displaying each window, the method may further include:

when it is detected that a current display interface of the source device changes, keeping displaying content of each window; and after a second instruction for operating each created and displayed window is detected, sending the second instruction to the source device to instruct the source device to keep the current display interface unchanged, and performing, according to the second instruction, an operation on the corresponding window running in a background of the source device.

This manner belongs to a differentiated-screen projection manner. When the user performs an operation on the source device, content displayed on the target device remains unchanged. When the user operates on the target device, content displayed on the source device remains unchanged, and the two devices are independent of each other. When the user performs an operation on a window X on the target device, a corresponding operation instruction is sent to the source device, and the source device performs, according to the operation instruction, the operation on the window X running in the background, without affecting content currently displayed on the source device. Then, the source device transmits refreshed window content of the window X in the background to the target device. Finally, content of the window X displayed on the target device is refreshed.

According to a second aspect, an embodiment of this application provides another screen projection display method, applied to a source device that performs screen projection. The method includes:

sending screen projection request information to a target device; and after acknowledgment information returned by the target device based on the screen projection request information is received, sending window data of an enabled application to the target device to indicate the target device to display the window data of the enabled application, where the window data includes display content corresponding to at least two windows opened in the same application enabled by the source device.

The source device sends the screen projection request information to the target device; and after receiving the acknowledgment information returned by the target device based on the screen projection request information, sends the window data of the enabled application to the target device to indicate the target device to display the window data of the enabled application. The target device onto which a screen is to be projected obtains the window data of the application enabled by the source device. The window data not only includes content of a currently visible window on the source device, but also includes content of a window that is enabled by the source device but is invisible. The target device displays the window data on a display interface of the target device, to implement projection of the content of the invisible window on the source device onto the target device for display.

Further, the sending window data of an enabled application to the target device to indicate the target device to display the window data of the enabled application may include:

sending window data of each window opened in the enabled application to the target device, to indicate the target device to create and display each window based on the window data of each window and a window identifier included in the window data, where a window component of each window is in an active state, a layer of each window component is in a visible state, and the window data of each window includes the corresponding window identifier.

The target device can distinguish between window data of different windows based on the window identifiers included in all the window data, to create different windows. In addition, because the window components of these windows are activated and the layers thereof are visible, content of these windows can be displayed on the display interface of the target device.

Further, before the sending window data of each window opened in the enabled application to the target device, the method may further include:

if it is detected that a new window is opened in any enabled application, setting a window component of the new window to be in an active state, and setting a layer of the window component of the new window to be in a visible state.

Once the source device detects that a new window is opened in an application, a window component of the new window is set to be in an active state, and a layer of the window component is set to be in a visible state. Regardless of whether the new window is currently displayed or running in the background, all attributes of the window component of the new window are specially set, so that the new window is subsequently projected onto the target device for display.

According to a third aspect, an embodiment of this application provides another screen projection display method, where the method includes:

a source device sends screen projection request information to a target device;

after receiving the screen projection request information, the target device returns acknowledgment information to the source device based on the screen projection request information;

after receiving the acknowledgment information, the source device sends window data of an enabled application to the target device, where the window data includes display content corresponding to at least two windows opened in the same application enabled by the source device; and the target device obtains and displays the window data of the enabled application.

First, the source device sends the screen projection request information to the target device. After receiving the screen projection request information, the target device returns the acknowledgment information to the source device based on the screen projection request information. After receiving the acknowledgment information, the source device sends the window data of the enabled application to the target device. Finally, the target device obtains and displays the window data of the enabled application. The window data not only includes content of a currently visible window on the source device, but also includes content of a window that is enabled by the source device but is invisible. The target device displays the window data on a display interface of the target device, to implement projection of the content of the invisible window on the source device onto the target device for display.

According to a fourth aspect, an embodiment of this application provides a screen projection display system, including:

a source device, configured to: send screen projection request information to a target device, and send window data of an enabled application to the target device after receiving acknowledgment information returned by the target device based on the screen projection request information, where the window data includes display content corresponding to at least two windows opened in the same application enabled by the source device; and the target device, configured to: after receiving the screen projection request information sent by the source device, return the acknowledgment information to the source device based on the screen projection request information, and obtain and display the window data of the enabled application.

According to a fifth aspect, an embodiment of this application provides a terminal device, including a memory, a processor, and a computer program that is stored in the memory and that can be run on the processor. When the processor executes the computer program, the steps of the screen projection display method provided in the first aspect of the embodiments of this application are implemented, or steps of the screen projection display method provided in the second aspect of the embodiments of this application are implemented.

According to a sixth aspect, an embodiment of this application provides a computer-readable storage medium. The computer-readable storage medium stores a computer program. When the computer program is executed by a processor, the steps of the screen projection display method provided in the first aspect of the embodiments of this application are implemented, or the steps of the screen projection display method provided in the second aspect of the embodiments of this application are implemented.

According to a seventh aspect, an embodiment of this application provides a computer program product. When the computer program product runs on a terminal device, the terminal device is enabled to perform the steps of the screen projection display method provided in the first aspect of the embodiments of this application or the steps of the screen projection display method provided in the second aspect of the embodiments of this application.

For technical effects that can be achieved in the second aspect to the seventh aspect, refer to the technical effects described in the first aspect. Details are not described herein again.

Compared with a conventional technology, the embodiments of this application have the following beneficial effects: Content of an invisible window on the source device can be projected onto the target device for display, thereby extending comprehensiveness and flexibility of screen projection display. In addition, an operation is simple, and strong practicability is achieved.

BRIEF DESCRIPTION OF THE DRAWINGS

FIG. 4 is a flowchart of a screen projection display method applied to a target device onto which a screen is to be projected according to an embodiment of this application;

FIG. 5 is a flowchart of another screen projection display method applied to a target device onto which a screen is to be projected according to an embodiment of this application;

FIG. 6 is a flowchart of a screen projection display method applied to a source device that performs screen projection according to an embodiment of this application;

FIG. 7 is an interaction flowchart of a screen projection display method according to an embodiment of this application;

DETAILED DESCRIPTION OF ILLUSTRATIVE EMBODIMENTS

Figure 1:
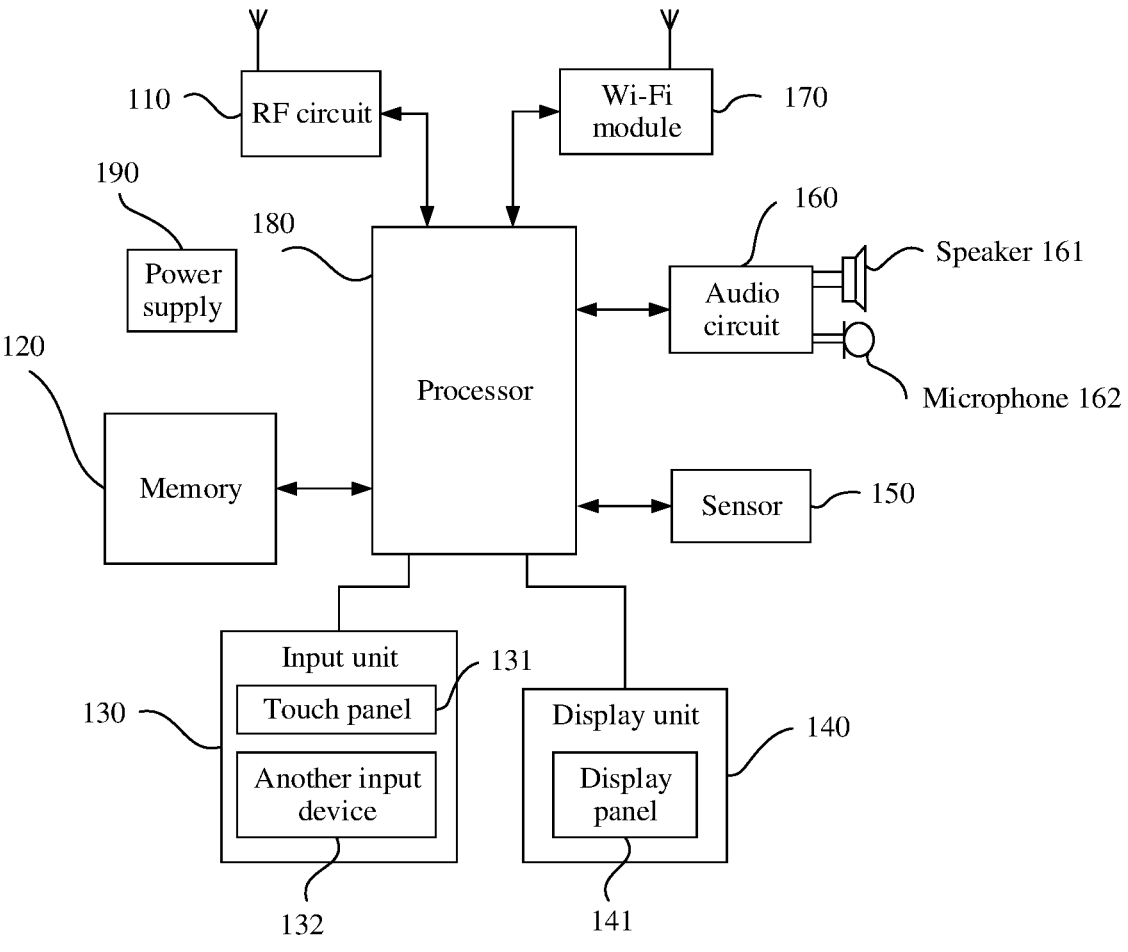
FIG. 1 is a schematic diagram of a hardware structure of a mobile phone to which a screen projection display method is applicable according to an embodiment of this application.

In the following descriptions, specific details of a specific apparatus structure, a technology, and the like are provided for description rather than limitation, to help thoroughly understand embodiments of this application. However, a person skilled in the art should know that this application may be practiced in other implementations without these specific details. In other cases, detailed descriptions of well-known apparatuses, circuits, and methods are omitted, so that this application is described without being obscured by unnecessary details.

Terms used in the following embodiments are merely intended to describe particular embodiments, but are not intended to limit this application. The terms "one", "a" and "this" of singular forms used in this specification and the appended claims of this application are also intended to include expressions such as "one or more", unless otherwise specified in the context clearly. It should also be understood that, in this embodiment of this application, "one or more" means one or two or more; "and/or" describes an association relationship for describing associated objects and represents that three relationships may exist. For example, A and/or B may represent the following three cases: Only A exists, both A and B exist, and only B exists. A and B each may be in a singular or plural form. The character "/" usually indicates an "or" relationship between associated objects.

A screen projection display method provided in embodiments of this application may be applied to a server or a terminal device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a large-screen television. Specific types of the terminal device and the server are not limited in embodiments of this application.

For example, the terminal device may be a station (STAION, ST) in a WLAN, or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device, another processing device connected to a wireless modem, a vehicle-mounted device, an Internet of Vehicles terminal, a computer, a laptop computer, a handheld communication device, a handheld computing device, a satellite wireless device, a wireless modem card, a set top box (set top box, STB) of a television, customer premises equipment (customer premises equipment, CPE) and/or another device for communication on a wireless apparatus, or a next generation communication apparatus such as a mobile terminal in a 5G network or a mobile terminal in a future evolved public land mobile network (Public Land Mobile Network, PLMN) network.

By way of example and not limitation, when the terminal device is a wearable device, the wearable device may alternatively be a general term of wearable devices that are developed through intelligent design of daily wear by using a wearable technology, for example, glasses, gloves, watches, clothing, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs.

For example, the terminal device is a mobile phone. FIG. 1 is a block diagram of a partial structure of a mobile phone according to an embodiment of this application. Referring to FIG. 1, the mobile phone includes components such as a radio frequency (Radio Frequency, RF) circuit 110, a memory 120, an input unit 130, a display unit 140, a sensor 150, an audio circuit 160, a wireless fidelity (wireless fidelity, Wi-Fi) module 170, a processor 180, and a power supply 190. Persons skilled in the art can understand that the mobile phone structure shown in FIG. 1 does not constitute any limitation on the mobile phone, and the mobile phone may include components more or fewer than those shown in the figure, or a combination of some components, or components in different arrangements.

The following describes each component of the mobile phone in detail with reference to FIG. 1.

The RF circuit 110 may be configured to receive and send signals in an information receiving and sending process or a call process. In particular, after receiving downlink information of a base station, the RF circuit 110 sends the downlink information to the processor 180 for processing. In addition, the RF circuit 110 sends uplink data is sent to the base station. Usually, an RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device through wireless communication. For the wireless communication, any communication standard or protocol may be used, including but not limited to global apparatus for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, and a short message service (Short Messaging Service, SMS).

The memory 120 may be configured to store a software program and a module. The processor 180 performs various function applications of the mobile phone and data processing by running the software program and the module that are stored in the memory 120. The memory 120 may mainly include a program storage area and a data storage area. The program storage area may store an operation apparatus, an application program required by at least one function (such as a voice playback function or an image playback function), and the like. The data storage area may store data (such as audio data or a phone book) created according to use of the mobile phone, and the like. In addition, the memory 120 may include a high-speed random access memory, or may include a nonvolatile memory, such as at least one magnetic disk storage device, a flash memory device, or another volatile solid-state storage device.

The input device 130 may be configured to: receive input digit or character information, and generate a key signal input related to a user setting and function control of the mobile phone. Specifically, the input unit 130 may include a touch panel 131 and another input device 132. The touch panel 131, also referred to as a touchscreen, may collect a touch operation performed by a user on or near the touch panel 131 (for example, an operation performed by the user on or near the touch panel 131 by using any proper object or accessory such as a finger or a stylus), and drive a corresponding connection apparatus according to a preset program. Optionally, the touch panel 131 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 180, and can receive and execute a command sent by the processor 180. In addition, the touch panel 131 may be implemented by using a plurality of types, such as a resistive type, a capacitive type, an infrared ray type, and a surface acoustic wave type. In addition to the touch panel 131, the input unit 130 may include the another input device 132. Specifically, the another input device 132 may include but be not limited to one or more of a physical keyboard, a functional key (such as a volume control key or an on/off key), a trackball, a mouse, or a joystick.

The display unit 140 may be configured to display information entered by the user or information provided for the user and various menus of the mobile phone. The display unit 140 may include a display panel 141. Optionally, the display panel 141 may be configured in a form of a liquid crystal display (Liquid Crystal Display, LCD), an organic light-emitting diode (Organic Light-Emitting Diode, OLED), or the like. Further, the touch panel 131 may cover the display panel 141. After detecting a touch operation on or near the touch panel 131, the touch panel 131 transmits information about the touch operation to the processor 180 to determine a type of the touch event, and then the processor 180 provides a corresponding visual output on the display panel 141 based on the type of the touch event. In FIG. 1, the touch panel 131 and the display panel 141 are used as two independent components to implement input and output functions of the mobile phone. However, in some embodiments, the touch panel 131 and the display panel 141 may be integrated to implement the input and output functions of the mobile phone.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light, and the proximity sensor may turn off the display panel 141 and/or backlight when the mobile phone moves close to an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio circuit 160, a speaker 161, and a microphone 162 may provide an audio interface between the user and the mobile phone. The audio circuit 160 may transmit, to the speaker 161, an electrical signal that is obtained after conversion of received audio data, and the speaker 161 converts the electrical signal into a sound signal for output. In addition, the microphone 162 converts a collected sound signal into an electrical signal; the audio circuit 160 receives the electrical signal and converts the electrical signal into audio data, and then outputs the audio data to the processor 180 for processing; and then processed audio data is sent to, for example, another mobile phone by using the RF circuit 110, or the audio data is output to the memory 120 for further processing.

Wi-Fi belongs to a short-range wireless transmission technology. By using the Wi-Fi module 170, the mobile phone may help the user receive and send emails, browse a web page, access streaming media, and the like. The Wi-Fi module 170 provides wireless broadband Internet access for the user. Although FIG. 1 shows the Wi-Fi module 170, it can be understood that, the Wi-Fi module 170 is not a mandatory component of the mobile phone, and may be totally omitted as required without changing the essence of this application.

The processor 180 is a control center of the mobile phone, is connected to all the parts of the entire mobile phone by using various interfaces and lines, and executes various functions of the mobile phone and processes data by running or executing the software program and/or the module that are/is stored in the memory 120 and by invoking data stored in the memory 120, to perform overall monitoring on the mobile phone. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the foregoing modem processor may be not integrated into the processor 180.

The mobile phone further includes the power supply 190 (for example, a battery) that supplies power to all the components. Preferably, the power supply may be logically connected to the processor 180 by using a power management apparatus, so that functions such as charging and discharging management and power consumption management are implemented by using the power management apparatus.

Although not shown, the mobile phone may further include a camera including at least one conventional RGB camera and at least one infrared camera or hyperspectral camera. Optionally, the camera may be located on a front face or a rear face of the mobile phone. This is not limited in embodiments of this application.

Optionally, the mobile phone may include a single camera, dual cameras, three cameras, or the like. This is not limited in embodiments of this application.

For example, the mobile phone may include three cameras: a main camera, a wide-angle camera, and a long-focus camera.

Optionally, when the mobile phone includes a plurality of cameras, all of the plurality of cameras may be front-facing cameras or rear-facing cameras, or some of them may be front-facing cameras and the others may be rear-facing cameras. This is not limited in embodiments of this application.

In addition, although not shown, the mobile phone may further include a Bluetooth module and the like, and details are not described herein.

Figure 2:
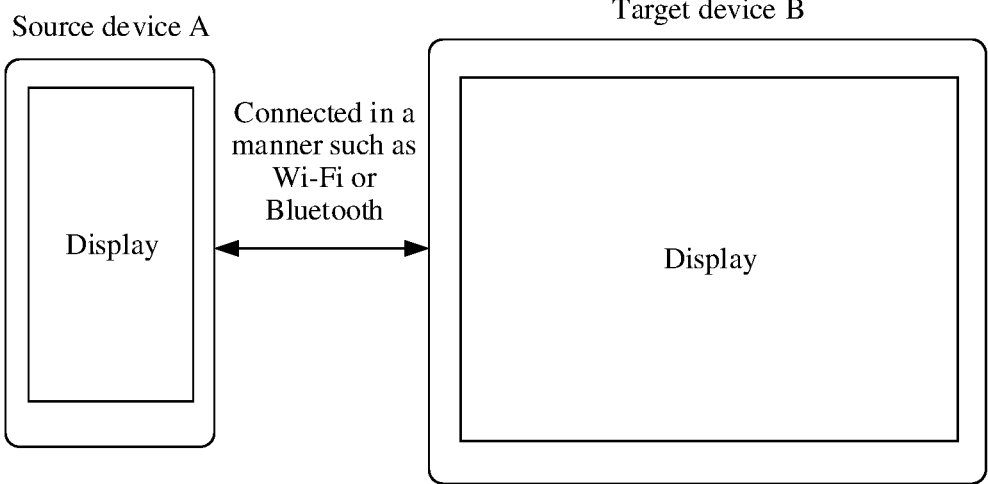
FIG. 2 is a schematic diagram of a screen projection display system according to an embodiment of this application.

FIG. 2 is a schematic diagram of a screen projection display system according to an embodiment of this application. The screen projection display system includes a source device A and a target device B. The source device A and the target device B each may be various types of terminal devices, for example, a device such as a mobile phone, a tablet computer, a PC, or a large-screen television. In other words, this application is applicable to mutual screen projection between all types of device combinations, for example, mobile phone projection to a tablet computer, mobile phone projection to a large-screen television, mobile phone projection to a mobile phone, mobile phone projection to a PC, tablet computer projection to a tablet computer, PC projection to a tablet computer, and PC projection to a large-screen television.

The source device A and the target device B may be connected to each other in various wired or wireless manners, for example, by using a data communication line or in a Bluetooth mode or a Wi-Fi mode. This is not limited in this application. Before screen projection display is performed, the source device A and the target device B need to be connected to each other, for example, by using a data communication line or in a Wi-Fi mode or a Bluetooth mode. After the source device A and the target device B are connected to each other, screen projection may be triggered on the source device A or may be triggered on the target device B. For example, on the target device B, a notification bar may be pulled down and a multi-screen collaborative display button may be touched. Then, a to-be-connected display interface of a corresponding screen projection display APP pops up. Meanwhile, a dialog box pops up on a display interface of the source device A to prompt a user to establish a connection. After the user performs a touch operation to successfully establish the connection, a screen projection display method provided in this application may be used to project each application window running on the source device A to a screen of the target device B for display.

Specifically, the source device A is configured to: send screen projection request information to the target device B, and send window data of an enabled application to the target device B after receiving acknowledgment information returned by the target device B based on the screen projection request information; and the target device B is configured to: after receiving the screen projection request information sent by the source device A, return the acknowledgment information to the source device A based on the screen projection request information, and obtain and display the window data of the enabled application.

Further, the target device B may be specifically configured to: obtain window data of each window opened in the application enabled by the source device, where a window component of each window is in an active state, a layer of each window component is in a visible state, and the window data of each window includes a corresponding window identifier; and create and display each window based on the window data of each window and the window identifier included in the window data.

Further, the windows include a first window and a second window, the first window is a window that is not currently displayed on the source device, the second window is a window currently displayed on the source device, and the target device B may be specifically configured to:

determine a first area and a second area from a display interface; and add the first window to the first area for display, and add the second window to the second area for display.

Further, the target device B may be further configured to:

if a third window opened from the first window is detected, add the third window to the second area for display, and close the second window; and if a fourth window opened from the second window is detected, add the fourth window to the second area to cover the second window for display.

Further, the target device B may be further configured to:

if a fifth window opened from the first window is detected, add the fifth window to the second area for display, and close the second window; and if a sixth window opened from the second window is detected, add the sixth window to the second area for display, and move the second window to the first area to cover the first window for display.

Further, the window data of each window further includes corresponding application information, window component information, and window attribute information, and the target device B may be specifically configured to:

determine a quantity of to-be-displayed windows and a size, a display location, and a display manner of a to-be-displayed window based on the application information, the window component information, and the window attribute information that are included in the window data of each window; and create and display the corresponding window on a display interface based on the quantity of to-be-displayed windows and the size, the display location, and the display manner of the to-be-displayed window.

Further, the target device B may be further configured to:

if a first instruction for performing an operation on any created and displayed window is detected, obtain target application information and target window component information that are included in window data of the any window; and send the first instruction, the target application information, and the target window component information to the source device to instruct the source device to determine both a to-be-operated target application and a to-be-operated target window based on the target application information and the target window component information, and perform an operation on the target window in the target application according to the first instruction.

Further, the target device B may be further configured to:

when it is detected that a current display interface of the source device changes, keep displaying content of each window; and after a second instruction for operating each created and displayed window is detected, send the second instruction to the source device to instruct the source device to keep the current display interface unchanged, and perform, according to the second instruction, an operation on the corresponding window running in a background of the source device.

Further, the source device A may be specifically configured to:

send the window data of each window opened in the enabled application to the target device, to indicate the target device to create and display each window based on the window data of each window and a window identifier included in the window data, where a window component of each window is in an active state, a layer of each window component is in a visible state, and the window data of each window includes the corresponding window identifier.

Further, the source device A may be further configured to:

if it is detected that a new window is opened in any enabled application, set a window component of the new window to be in an active state, and set a layer of the window component of the new window to be in a visible state.

For a specific working principle and implementation steps of screen projection display between the source device A and the target device B, refer to embodiments of screen projection display methods described below.

Figure 3:
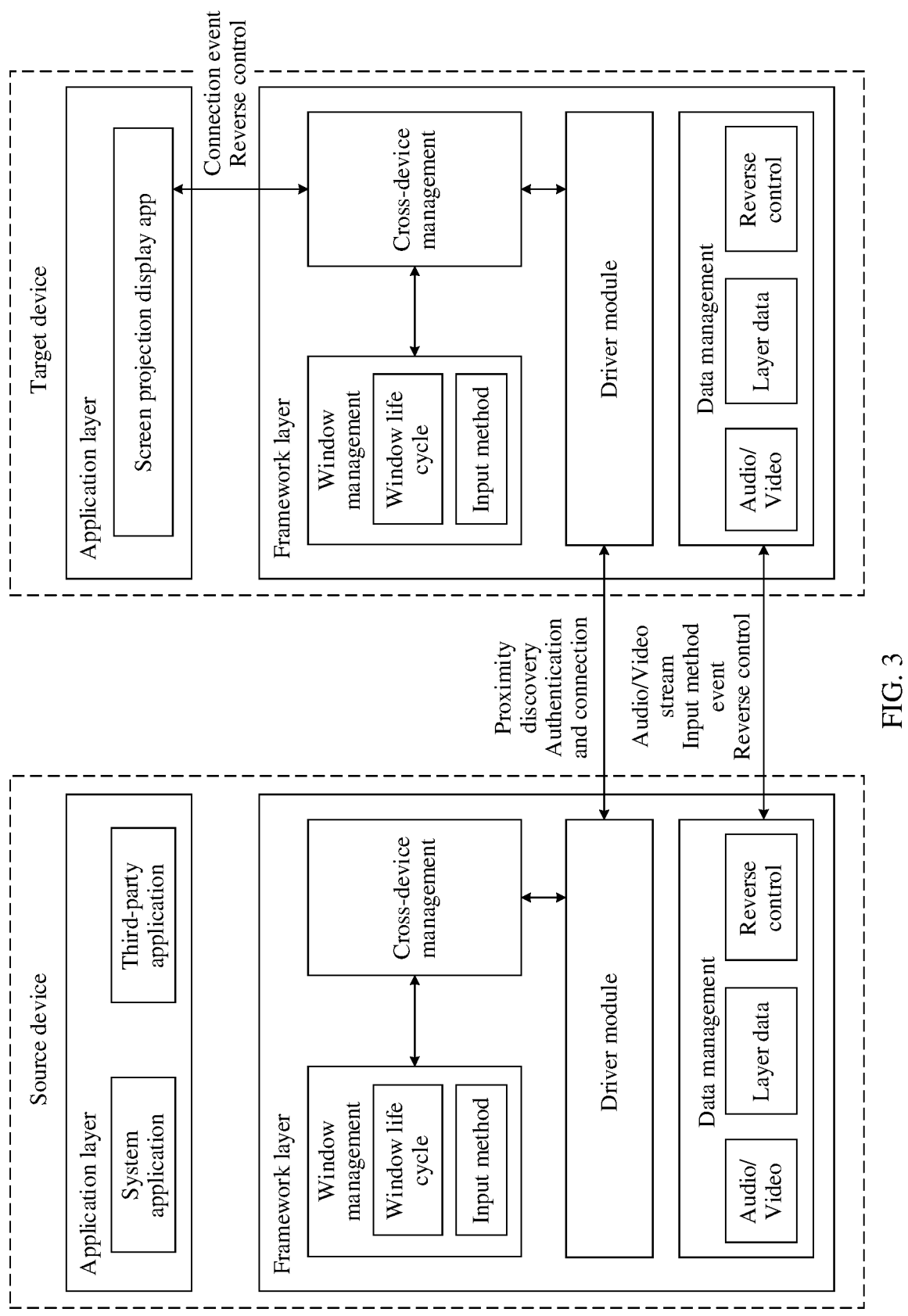
FIG. 3 is a software architecture diagram of a screen projection display system according to an embodiment of this application.

FIG. 3 is a software architecture diagram of a screen projection display system according to an embodiment of this application.

A left half part of FIG. 3 is a software architecture diagram of a source device. The source device is a device that proactively performs screen projection. For example, the source device may be a mobile phone. A software architecture of the source device may be divided into two parts: an application layer and a framework layer. The application layer includes a system application module and a three-party application module, and is configured to manage various applications running on the device. The framework layer includes a window management module, a cross-device management module, a data management module, and a driver module. The window management module is configured to manage display manners of all windows of the applications, including window display coordinates, a window display level, a window display attribute, and the like. The cross-device management module is responsible for proximity discovery, authentication, and connection between the source device and a target device, awareness of an application status on a source device side, file drag-in and drag-out, message notification, and the like. The data management module is responsible for transmitting a to-be-projected data stream such as audio, a video, and a layer between the source device and the target device, and is responsible for controlling a reverse event (that is, an event that is of controlling the source device and that is triggered by the target device) and another function. The driver module is an underlying driver, is responsible for discovery, authentication, configuration, and connection, provides a drive event (for example, an event that a device or device information is discovered or a device disappears) to the cross-device management module, and executes a command such as a connection command or a disconnection command delivered by the cross-device management module.

A right half part of FIG. 3 is a software architecture diagram of the target device. The target device is a device onto which a screen is to be projected. For example, the target device may be a tablet computer or a large-screen television. A software architecture of the target device may also be divided into two parts: an application layer and a framework layer. The application layer includes a screen projection display APP. The screen projection display APP is responsible for displaying a projected interface on the target device and is also responsible for management related to a UI display interface. The framework layer includes a window management module, a cross-device management module, a data management module, and a driver module. For functions of the function modules, refer to functions of the corresponding function modules in the framework layer of the source device.

All existing screen projection display methods are used for screen projection based on content of a display window that is on the source device and that is currently visible to a user, and have a specific limitation. To break the limitation, this application provides a new screen projection display method.

FIG. 4 is a flowchart of a screen projection display method applied to a target device onto which a screen is to be projected according to an embodiment of this application. The screen projection display method includes the following steps:

401: After screen projection request information sent by a source device is received, obtain window data of an application enabled by the source device.

After the source device and the target device are connected to each other, a user may perform a touch operation on the source device to send a piece of screen projection request information. After receiving the screen projection request information, the target device may return a piece of screen projection acknowledgment information to the source device, and then obtain the window data of the application enabled by the source device. The window data includes display content corresponding to at least two windows opened in the same application enabled by the source device. The window data may be layer data of more than one window opened in a same application enabled by the source device, or may be layer data of a plurality of windows opened in different applications enabled by the source device. Obviously, the window data not only includes content of a currently visible window on the source device, but also includes content of a window that is currently enabled by the source device but is invisible.

It should be noted that, after the source device and the target device are connected to each other, the user may also perform a touch operation on the target device side to send screen projection request information; and after receiving the screen projection request information, the source device sends the window data of the application enabled by the source device to the target device.

402: Display the window data of the enabled application.

After receiving the window data of the application enabled by the source device, the target device may display the window data on a display screen of the target device. Because the window data includes content of a window that is enabled on the source device but is invisible, the content of the invisible window on the source device is projected onto the target device for display. Specifically, the target device may determine, based on the obtained window data, information such as a quantity of to-be-displayed windows, a size of a to-be-displayed window, and an application to which the to-be-displayed window belong, determine a corresponding quantity of window display areas at corresponding locations from a display interface of the device, and respectively display, in the areas, content of different windows enabled by the source device.

In this embodiment of this application, the target device onto which a screen is to be projected obtains the window data of the application enabled by the source device. The window data not only includes content of a currently visible window on the source device, but also includes content of a window that is enabled by the source device but is invisible. The target device displays the window data on the display interface of the target device, to implement projection of the content of the invisible window on the source device onto the target device for display.

FIG. 5 is a flowchart of another screen projection display method applied to a target device onto which a screen is to be projected according to an embodiment of this application. The screen projection display method includes the following steps:

501: After screen projection request information sent by a source device is received, obtain window data of each window opened in an application enabled by the source device.

After receiving the screen projection request information sent by the source device, the target device obtains the window data of each window opened in the application enabled by the source device. For example, if the source device has enabled an application A and opened windows $A_1$ and $A_2$ in the application A, the target device obtains both window data of $A_1$ and window data of $A_2$; and if the source device has enabled applications A and B and opened the windows $A_1$ and $A_2$ in the application A and windows $B_1$, $B_2$, and $B_3$ in the application B, the target device separately obtains the window data of $A_1$, the window data of $A_2$, window data of $B_1$, window data of $B_2$, and window data of $B_3$.

To display content of each window on the target device, the source device needs to perform special processing on each window of the application in advance, so that a window component of each window is in an active state and a layer of each window component is in a visible state. For example, for an application in an Android system, a basic unit for implementing differentiated display of windows in the application is an Activity component, that is, a window component. Generally, for a visible window currently displayed on the source device, a status of an Activity component of the window is resumed (activated), and a visible attribute of a layer of the window is true (that is, the layer is in a visible state). For a window that is currently invisible on the source device, a status of an Activity component of the window is paused or stopped (stopped or stopped), and a visible attribute of a layer of the window is false (that is, the layer is in an invisible state). To display the invisible window on the target device, first, a status of an Activity component of each invisible window on the source device needs to be set to resumed and a visible attribute of a layer of the window needs to be set to true by using a window service function in a system software architecture.

In a conventional screen projection solution, all window data received by the target device is window data of a same window (a window currently displayed on the source device). Therefore, it is not necessary to determine which window in which application received window data belongs to. However, in this embodiment of this application, the target device needs to determine a specific window to which each piece of obtained window data belongs to. Therefore, the source device needs to add information such as a window identifier to the window data. The window data of each window includes a corresponding window identifier. In this way, when subsequently displaying the window data, the target device can create and display content of each window based on window data of different windows.

502: Create and display each window based on the window data of each window and the window identifier included in the window data.

After obtaining the window data of each window opened in the application enabled by the source device, the target device creates and displays each window based on the window data of each window and the window identifier included in the window data. For example, if the target device obtains the window data of the window A and the window B that are enabled by the source device, two areas may be determined from a display interface of the device, the window A is created based on the window data of the window A and displayed in one of the areas, and the window B is created based on the window data of the window B and displayed in the other area.

Further, the window data of each window further includes corresponding application information, window component information, and window attribute information, and the creating and displaying each window may include:

(1) determining a quantity of to-be-displayed windows and a size, a display location, and a display manner of a to-be-displayed window based on the application information, the window component information, and the window attribute information that are included in the window data of each window; and (2) creating and displaying the corresponding window on a display interface based on the quantity of to-be-displayed windows and the size, the display location, and the display manner of the to-be-displayed window.

In the window data of each window, the corresponding application information, window component information, and window attribute information may be further added. The application information may include key information such as an application identifier and a userid. The information identifies a specific application and is used for data differentiation between applications. The window component information is, for example, Activity information. There may be a plurality of Activities in one application. Therefore, the window data needs to carry various attribute information of the Activities, for example, token handles and component component names of the Activities and information whether the Activities are main interfaces. The window attribute information is, for example, window information. One Activity may include a plurality of window layers. The window layer is a basic unit of layer display. In other words, one Activity may include a plurality of window layers. Key information such as a layer size and a spacing is defined in the window layer. In an actual operation, the information may be added to buffer data of a window data layer. For example, header information may be added to the buffer data to mark information about each layer.

After the application information, the window component information, and the window attribute information that are included in the window data of each window are obtained, the quantity of to-be-displayed windows and the size, the display location, and the display manner of the to-be-displayed window may be determined based on the information, and then the corresponding window is created and displayed on the display interface. How to determine an area on the display interface, a quantity of areas to be determined on the display interface, a size of a display window in each area, a window display manner, and the like may all be set based on the information. From the application information, an application mode such as a navigation mode may be obtained, and it can also be learned which window is a home page. In this way, the target device can display a home page window on a left side of a screen and display other windows on a right side of the screen in a stacked manner.

Further, after the creating and displaying the corresponding window on a display interface, the method may further include:

(1) if a first instruction for performing an operation on any created and displayed window is detected, obtaining target application information and target window component information that are included in window data of the any window; and (2) sending the first instruction, the target application information, and the target window component information to the source device to instruct the source device to determine both a to-be-operated target application and a to-be-operated target window based on the target application information and the target window component information, and performing an operation on the target window in the target application according to the first instruction.

After the target device creates and displays the corresponding window on the display interface, a user may perform an operation on the window on the display interface of the target device, which is equivalent to performing reverse control on the corresponding window on the source device. When the user touches a window of a screen projection application on the target device, an original process is to directly reversely transmit event coordinates and type information to the source device. By contrast, in this application, handle information of a window component needs to be added for an event that is reversely transmitted to the source device. This indicates a specific window on which the coordinates of the event fall, to determine the specific window that is on the source device and on which an operation is to be performed. The target device may send, to the source device, the detected operation instruction and the target application information and the target window component information that are included in the window data of the corresponding window, so that the source device determines the target application and the target window that are corresponding to the operation instruction, and performs a corresponding operation on the target window in the target application. In general, an input event on the target device is sent to the source device through a cross-device channel, and the source device simulates the identical event and sends the event to a corresponding window in an application for execution. After the event is executed, if content of the corresponding window on the source device is refreshed, content of the corresponding window on the display interface of the target device is also refreshed.

Further, the windows include a first window and a second window, the first window is a window that is not currently displayed on the source device, the second window is a window currently displayed on the source device, and the displaying each window may include:

(1) determining a first area and a second area from a display interface; and (2) adding the first window to the first area for display, and adding the second window to the second area for display.

For example, windows to be displayed on the target device include a window A and a window B. The window A is a window that has run on the source device but is not currently displayed, and the window B is a window that is currently displayed on the source device. In this case, two areas, namely, a left area and a right area, may be determined from the display interface of the target device. Sizes of the two areas may be the same or different, and a size of each area may be the same as a screen size of the source device. Then, the window A is added to the left area for display, and the window B is added to the right area for display.

Further, after the adding the first window to the first area for display, and adding the second window to the second area for display, the method may further include:

if a third window opened from the first window is detected, adding the third window to the second area for display, and closing the second window; and if a fourth window opened from the second window is detected, adding the fourth window to the second area to cover the second window for display.

This manner belongs to a screen projection display manner in a navigation mode. The foregoing example is also used for description. If a new window C opened from the window A is detected (the user performs an operation on the window A on the display interface of the target device to open the window C), the window C is added to the right area for display, that is, covers the window B for display. After the window C is displayed, the system closes the window B. If a new window D opened from the window B is detected, the window D is added to the right area to cover the window B for stacked display. If a new window continues to be opened from the window A, the new window continues to be added to the right area, that is, covers the window C for display. After that, the system closes the window C. If a new window continues to be opened from the window D, the new window covers the window D for stacked display; and so on.

Further, after the adding the first window to the first area for display, and adding the second window to the second area for display, the method may further include:

if a fifth window opened from the first window is detected, adding the fifth window to the second area for display, and closing the second window; and if a sixth window opened from the second window is detected, adding the sixth window to the second area for display, and moving the second window to the first area to cover the first window for display.

This manner belongs to a screen projection display method in a shopping mode. The foregoing example is also used for description. If a new window E opened from the window A is detected, the window E is added to the right area for display, that is, covers the window B for display. After the window E is displayed, the system closes the window B. If a new window F opened from the window B is detected, the window F is added to the right area (that is, an original location of the window B) for display, and the window B is moved to the left area to cover the window A for stacked display. If a new window continues to be opened from the window A, the new window continues to be added to the right area, that is, covers the window E for display. After that, the system closes the window E. If a new window continues to be opened from the window F, the new window covers the window F for stacked display, and the window F is moved to the left area to cover the window B for stacked display; and so on.

The foregoing display manner is a dual-window display mode of the target device, and depends on an application window currently running on the source device. If only one application window is currently running, the unique application window may be added to the left area for display.

For the target device, a single-window display mode or a multi-window display mode may also be set. In other words, only one application window currently running on the source device may be displayed, or a plurality of or all application windows currently running on the source device may be displayed at the same time, provided that a corresponding quantity of window display areas are determined from a display interface of the source device.

In addition, if it is detected that a touch operation is performed on the source device to allow the source device to return to a desktop, the target device may switch from the dual-window display mode to the single-window display mode, and display content of the desktop of the source device in the single-window display mode. This manner belongs to a same-screen projection manner.

Further, after the creating and displaying each window, the method may further include:

(1) when it is detected that a current display interface of the source device changes, keeping displaying content of each window; and (2) after a second instruction for operating each created and displayed window is detected, sending the second instruction to the source device to instruct the source device to keep the current display interface unchanged, and performing, according to the second instruction, an operation on the corresponding window running in a background of the source device.

This manner belongs to a differentiated-screen projection manner. When the user performs an operation on the source device, content displayed on the target device remains unchanged. When the user operates on the target device, content displayed on the source device remains unchanged, and the two devices are independent of each other. During differentiated-screen projection, the navigation mode and the shopping mode described above are also supported. When the user performs an operation on the source device, the content displayed on the target device remains unchanged provided that an operation object is not a window displayed on the target device. When the user performs an operation on a window X on the target device, a corresponding operation instruction is sent to the source device, and the source device performs, according to the operation instruction, the operation on the window X running in the background, without affecting content currently displayed on the source device. Then, the source device transmits refreshed window content of the window X in the background to the target device. Finally, content of the window X displayed on the target device is refreshed.

In an actual operation, the source device may run two displays (display 0 and display 1). The display 0 displays original content of the source device, where the content is visible to the user on the source device. The other display, namely, the display 1, displays content of an application window projected onto the target device, where the content is invisible to the user on the source device, in other words, the application window runs in the background of the source device. An event on the target device is transmitted to the application window on the display 1 of the source device through a cross-device transmission channel.

Before screen projection display is performed, window components of windows that are in the application of the source device and that have run are preset to be in an active state, and layers of these window components are preset to be in a visible state. Then, the source device sends, to the target device, window data of these windows that have run (which may include a currently visible window on the source device and an invisible window running in a background). The target device can distinguish between window data of different windows based on the window identifiers included in all the window data, to create different windows. In addition, because the window components of these windows are activated and the layers thereof are visible, content of these windows can be displayed on the display interface of the target device, in other words, content of the invisible window on the source device is projected onto the target device for display.

FIG. 6 is a flowchart of a screen projection display method applied to a source device that performs screen projection according to an embodiment of this application. The screen projection display method includes the following steps:

601: Send screen projection request information to a target device.

In this embodiment of this application, an execution body is the source device. After the source device and the target device are connected to each other, a user may perform a touch operation on the source device to send a piece of screen projection request information to the target device.

602: After acknowledgment information returned by the target device based on the screen projection request information is received, send window data of an enabled application to the target device to indicate the target device to display the window data of the enabled application.

The user may perform an operation on the target device to agree to perform screen projection display, and perform a touch operation to return acknowledgment information to the source device. After receiving the acknowledgment information, the source device sends the window data of the enabled application to the target device to indicate the target device to display the window data of the enabled application. The window data may be layer data of more than one window opened in a same application enabled by the source device, or may be layer data of a plurality of windows opened in different applications enabled by the source device. Obviously, the window data not only includes content of a currently visible window on the source device, but also includes content of a window that is currently enabled by the source device but is invisible. After receiving the window data of the application enabled by the source device, the target device may display the window data on a display screen of the target device. Because the window data includes content of a window that is enabled on the source device but is invisible, the content of the invisible window on the source device is projected onto the target device for display. Specifically, the target device may determine, based on the obtained window data, information such as a quantity of to-be-displayed windows, a size of a to-be-displayed window, and an application to which the to-be-displayed window belong, determine a corresponding quantity of window display areas at corresponding locations from a display interface of the device, and respectively display, in the areas, content of different windows enabled by the source device.

Further, the sending window data of an enabled application to the target device to indicate the target device to display the window data of the enabled application may include:

sending window data of each window opened in the enabled application to the target device, to indicate the target device to create and display each window based on the window data of each window and a window identifier included in the window data.

A window component of each window is in an active state, a layer of each window component is in a visible state, and the window data of each window includes the corresponding window identifier. The target device can distinguish between window data of different windows based on the window identifiers included in all the window data, to create different windows. In addition, because the window components of these windows are activated and the layers thereof are visible, content of these windows can be displayed on the display interface of the target device.

Further, before the sending window data of each window opened in the enabled application to the target device, the method may further include:

if it is detected that a new window is opened in any enabled application, setting a window component of the new window to be in an active state, and setting a layer of the window component of the new window to be in a visible state.

Once the source device detects that a new window is opened in an application, a window component of the new window is set to be in an active state, and a layer of the window component is set to be in the visible state. Regardless of whether the new window is currently displayed or running in the background, all attributes of the window component of the new window are specially set, so that the new window can be subsequently projected onto the target device for display. Specifically, the window management module in the software architecture diagram shown in FIG. 3 may be used to modify a window component attribute of each window. The window management module has an absolute right to manage all application windows, and may set a window component attribute and manage life cycle statuses of the windows.

In this embodiment of this application, the source device sends the screen projection request information to the target device; and after receiving the acknowledgment information returned by the target device based on the screen projection request information, sends the window data of the enabled application to the target device to indicate the target device to display the window data of the enabled application. The target device onto which a screen is to be projected obtains the window data of the application enabled by the source device. The window data not only includes content of a currently visible window on the source device, but also includes content of a window that is enabled by the source device but is invisible. The target device displays the window data on a display interface of the target device, to implement projection of the content of the invisible window on the source device onto the target device for display.

FIG. 7 is an interaction flowchart of a screen projection display method according to an embodiment of this application. The screen projection display method includes the following steps:

701: A source device sends screen projection request information to a target device.

After the source device and the target device are connected to each other, a user may perform a touch operation on the source device to send a piece of screen projection request information to the target device.

702: After receiving the screen projection request information, the target device returns acknowledgment information to the source device based on the screen projection request information.

After the target device receives the screen projection request information, the user may perform a touch operation on the target device to agree to perform a screen projection display operation, and the target device returns acknowledgment information to the source device based on the screen projection request information.

703: After receiving the acknowledgment information, the source device sends window data of an enabled application to the target device.

After receiving the acknowledgment information, the source device sends the window data of the enabled application to the target device. The window data may be layer data of more than one window opened in the same application enabled by the source device, or may be layer data of a plurality of windows opened in different applications enabled by the source device.

704: The target device obtains and displays the window data of the enabled application.

After receiving the window data of the application enabled by the source device, the target device may display the window data on a display screen of the target device. Because the window data includes content of a window that is enabled on the source device but is invisible, the content of the invisible window on the source device is projected onto the target device for display.

In this embodiment of this application, first, the source device sends the screen projection request information to the target device; and after receiving the screen projection request information, the target device returns the acknowledgment information to the source device based on the screen projection request information. After receiving the acknowledgment information, the source device sends the window data of the enabled application to the target device. Finally, the target device obtains and displays the window data of the enabled application. The window data not only includes content of a currently visible window on the source device, but also includes content of a window that is enabled by the source device but is invisible. The target device displays the window data on a display interface of the target device, to implement projection of the content of the invisible window on the source device onto the target device for display.

It should be understood that sequence numbers of the processes do not mean execution sequences in the foregoing embodiments. The execution sequences of the processes should be determined according to functions and internal logic of the processes, and should not be construed as any limitation on the implementation processes of embodiments of this application.

For ease of understanding, the following describes the screen projection display method provided in this application by using several actual application scenarios.

Figure 8:
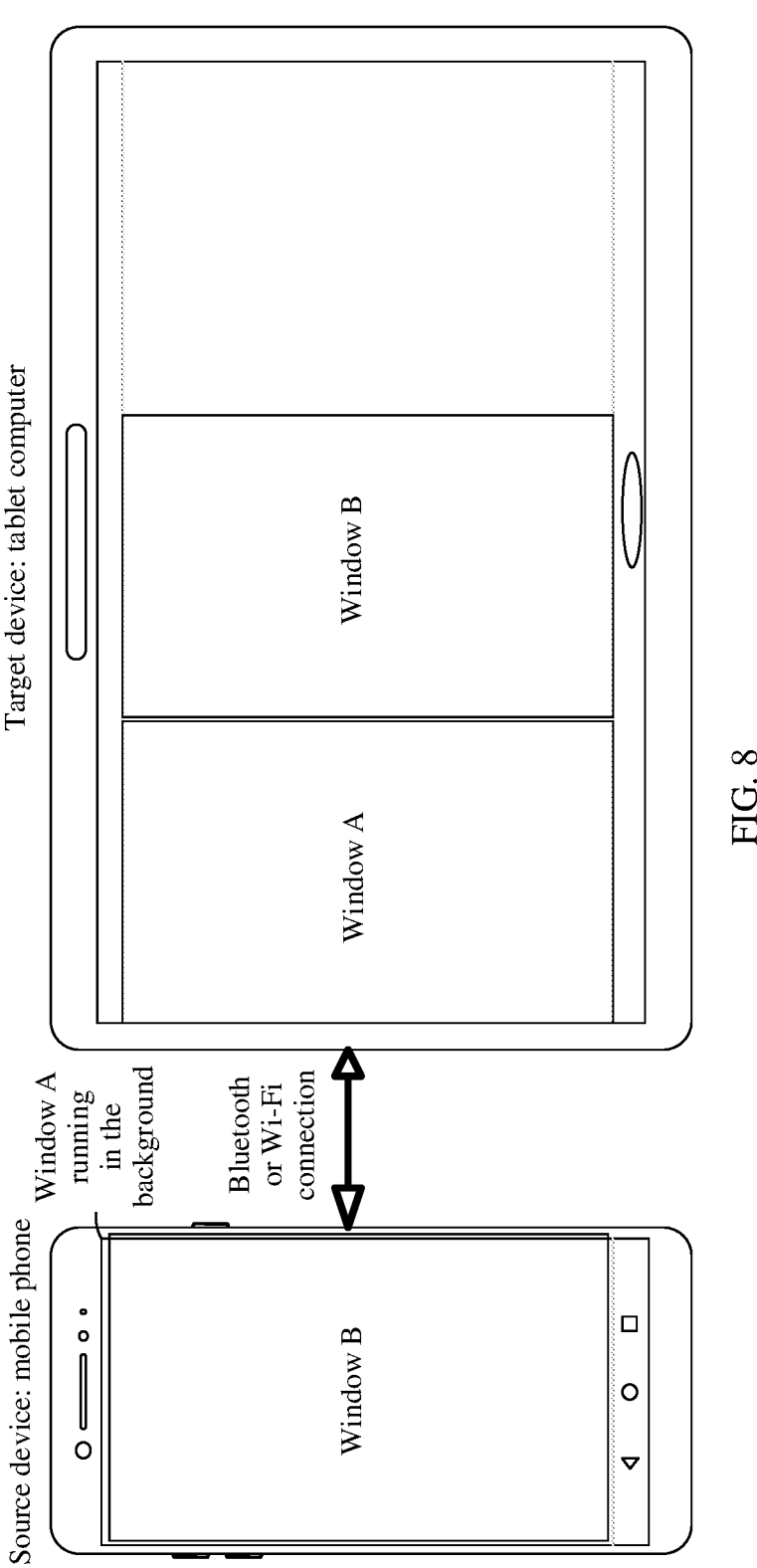
FIG. 8 is a schematic diagram of an application of a screen projection display method in an actual scenario according to an embodiment of this application.

FIG. 8 is a schematic diagram of an application of a screen projection display method in an actual scenario according to this application.

In FIG. 8, a source device that performs screen projection is a mobile phone, and a target device onto which a screen is to be projected is a tablet computer.

The mobile phone and the tablet computer may be connected to each other in a manner of Bluetooth, a data cable, Wi-Fi, or the like. Preferably, operations such as device discovery and device connection may be performed in the Bluetooth manner, and to-be-projected window data may be transmitted in the Wi-Fi manner, so that a data transmission delay is relatively short.

An application window currently displayed on the mobile phone is a window B, and an application window running in a background is a window A. During a screen projection operation, after the mobile phone and the tablet computer are connected to each other, a user may touch a multi-screen collaborative display button in a notification bar of the tablet computer, and then the tablet computer pops up a to-be-connected interface of a screen projection display APP. In this case, the mobile phone pops up a prompt box to require the user to confirm to establish a screen projection connection. After the user touches "connect" on the mobile phone to successfully establish the connection, the mobile phone sends, to the tablet computer, window data of the window A and the window B that are enabled to run. After receiving the window data, the tablet computer displays both the window A and the window B on a display interface. Specifically, sizes of the window A and the window B displayed on the tablet computer may be the same as a screen size of the mobile phone. A quantity of display windows and locations of display windows may be arbitrarily set. For example, if the mobile phone has enabled and run 10 application windows, 10 areas may be arbitrarily determined from a screen of the tablet computer and used for respectively displaying the 10 application windows.

In FIG. 8, the window A is displayed on a leftmost side of the tablet computer, and the window B is displayed on a right side of the window A. The user may set a screen projection display mode such as a navigation mode or a shopping mode in the tablet computer. For a corresponding display manner for opening a new window, refer to the foregoing description about the navigation mode or the shopping mode.

In addition, the user may perform reverse operation control on the window A and the window B on the tablet computer. During a touch operation on the tablet computer, an identical operation event is simulated on the mobile phone, and the mobile phone is triggered to perform a corresponding operation and refresh content of the windows. Then, content of the windows displayed on the tablet computer is refreshed accordingly.

Figure 9:
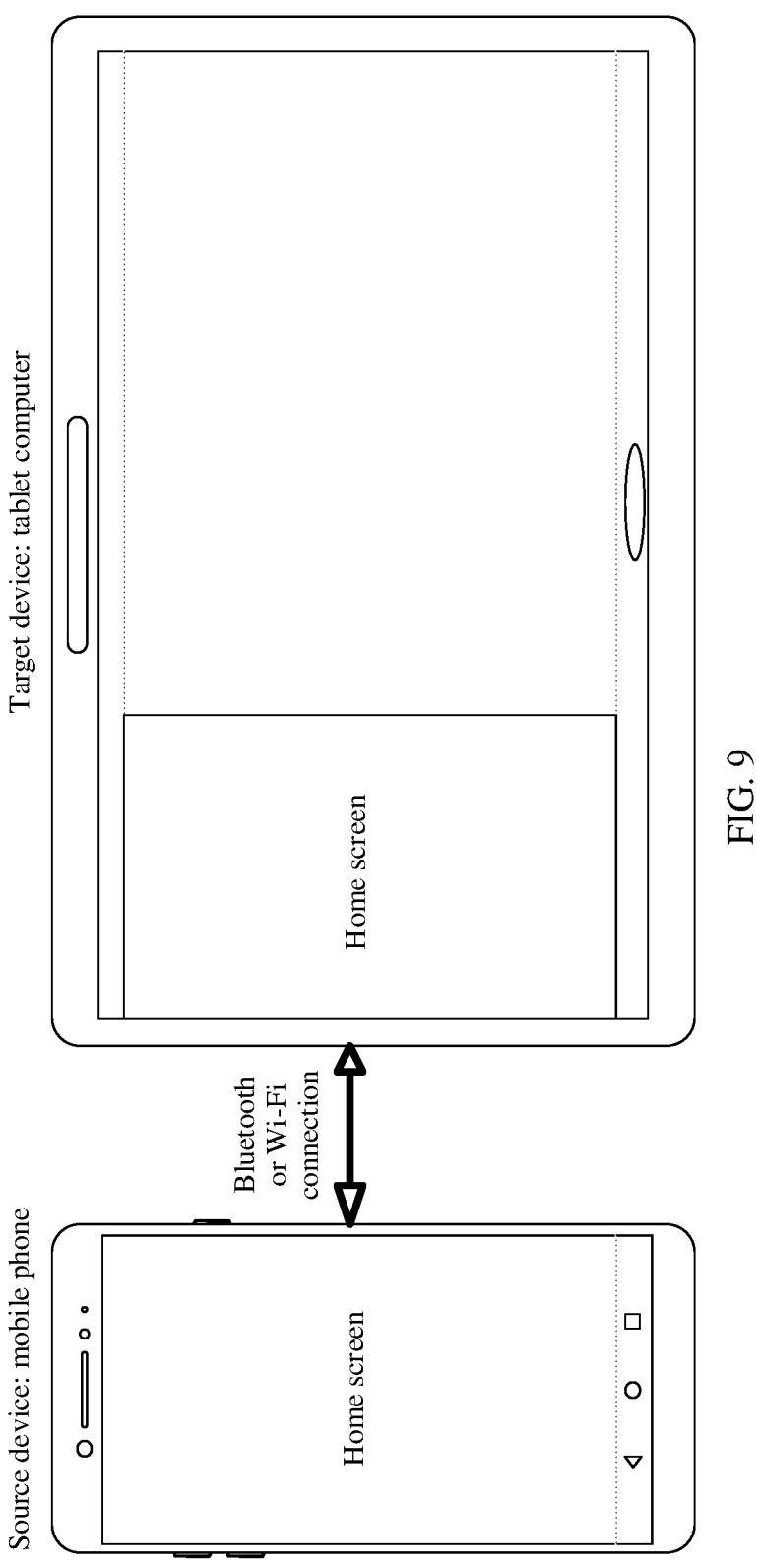
FIG. 9 is a schematic diagram of screen display of a tablet computer after a mobile phone returns to a desktop in the scenario shown in FIG. 8.

In a same-screen projection scenario, if the user performs a touch operation on the mobile phone to return to a desktop, the tablet computer switches back to a single-window display mode to display only content of the desktop of the mobile phone, as shown in FIG. 9.

Figure 10:
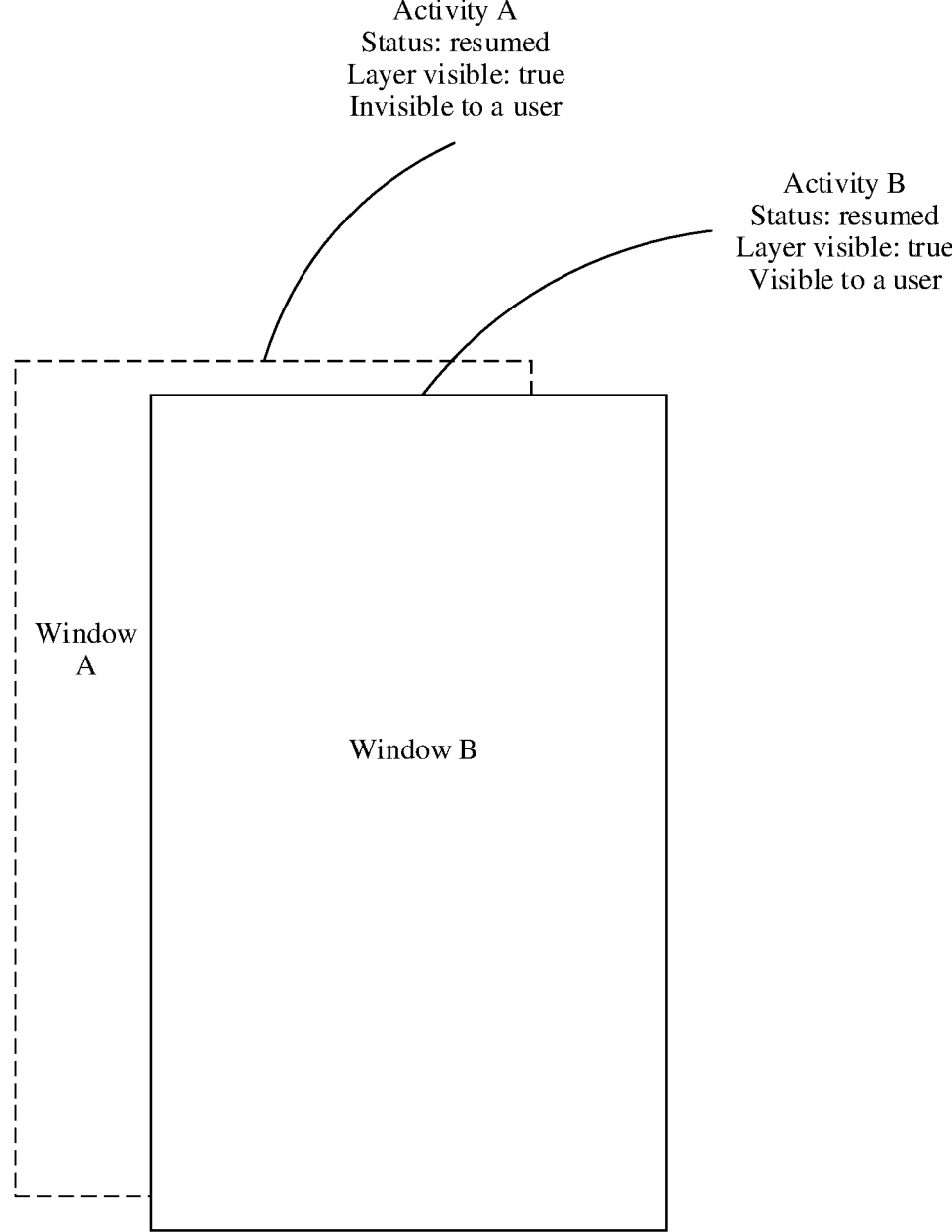
FIG. 10 is a schematic diagram of attributes of a window component of a window A and a window component of a window B in the scenario shown in FIG. 8.

In the system background of the mobile phone, special processing needs to be performed on an attribute of a window component Activity A of the window A. As shown in FIG. 10, a status of Activity A is set to resumed (activated), and "visible" of a layer thereof is set to true (the layer is visible). In addition, because the window B is a window currently displayed on the mobile phone, a status of a window component Activity B of the window B is also resumed, and "visible" of a layer thereof is also true.

Figure 11:
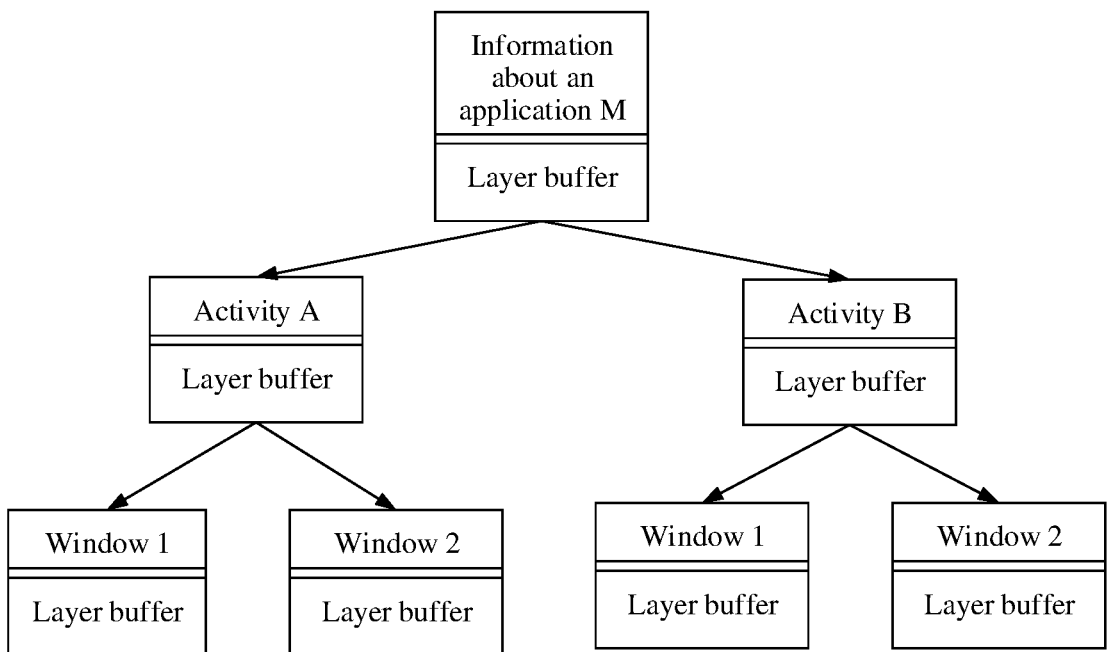
FIG. 11 is a schematic diagram of layer division of window data of the window A and the window B in the scenario shown in FIG. 8.

After receiving the window data of the window A and the window B that is transmitted by the mobile phone, the tablet computer needs to determine a specific application and a specific window to which obtained window data belongs. Specifically, header information may be added to buffer data of a window layer to mark an attribute of the layer. Assuming that both the window A and the window B are windows enabled in an application M, FIG. 11 is a schematic diagram of layer division of window data. Attribute information of the application M, for example, information such as an application name and a userid, may be added to layer buffer data of the application M to mark a specific application, to implement data differentiation between different applications. Window component attribute information of the window A may be added to layer buffer data of Activity A, and window component attribute information of the window B may be added to layer buffer data of Activity B. For example, the window component attribute information is information such as token handles and component names of the Activities and information whether the Activities are main interfaces. One Activity may include a plurality of windows. The window is a basic unit of layer display. Key information such as a layer size and a spacing may be added to layer buffer data of the window. After obtaining window data including related layer attribute information, the tablet computer may determine a display manner of each window based on the attribute information.

Figure 12A:
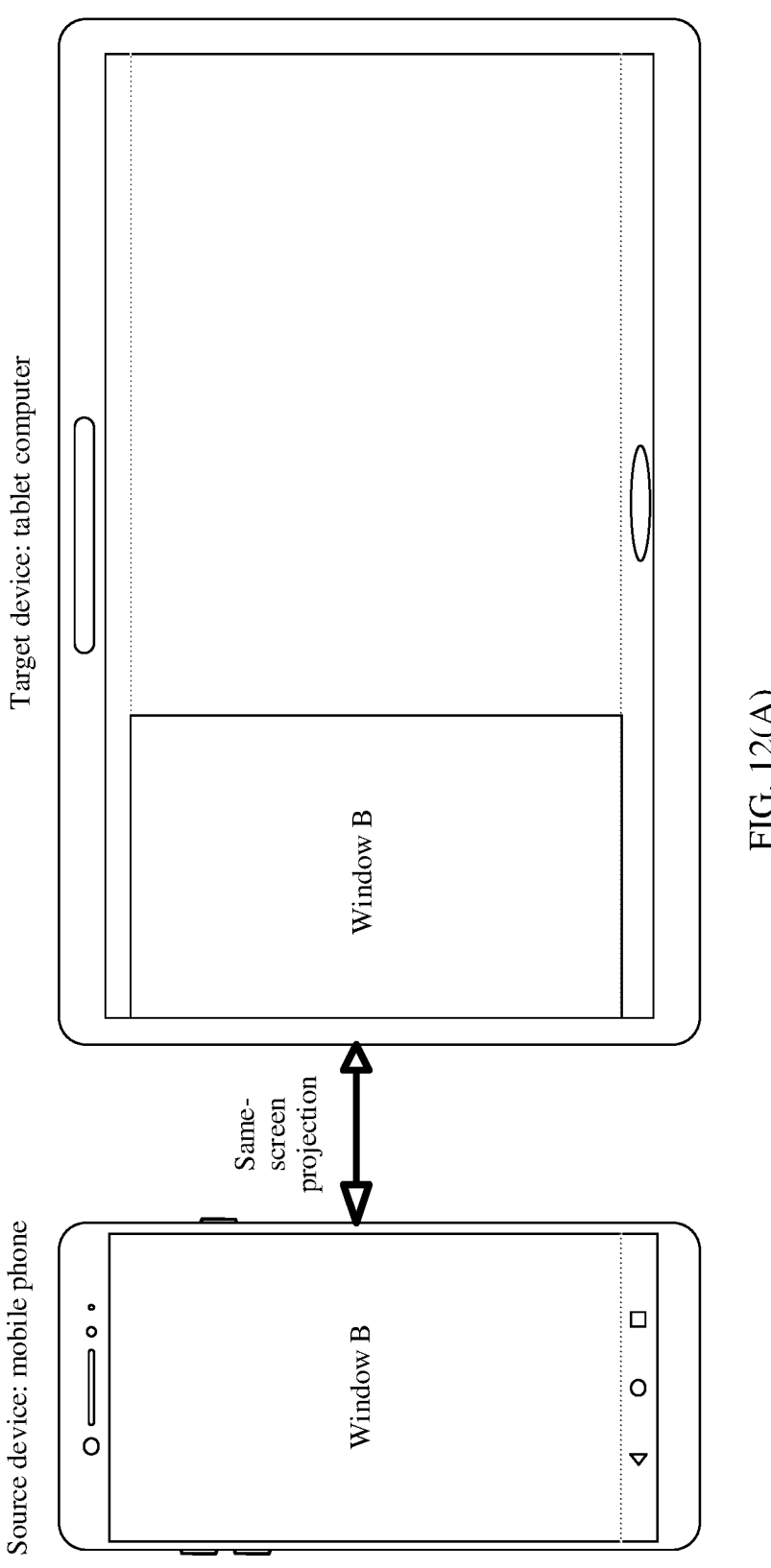
FIG. 12(A) is a schematic diagram of an application of a screen projection display method in a same-screen projection scenario according to an embodiment of this application.
Figure 12B:
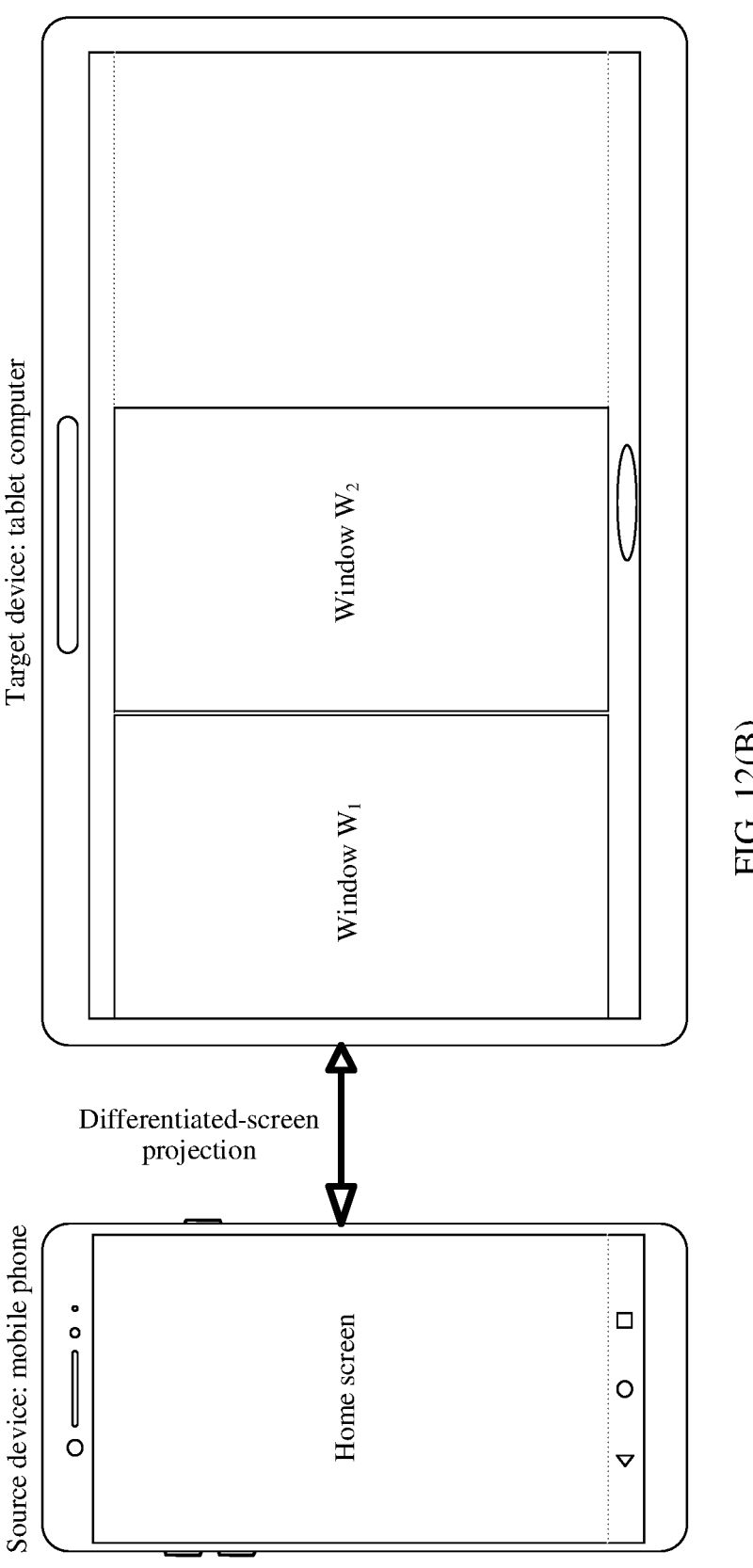
FIG. 12(B) is a schematic diagram of an application of a screen projection display method in a differentiated-screen projection scenario according to an embodiment of this application.

FIG. 12(A) and FIG. 12(B) are a schematic interface diagram showing switching from same-screen projection to differentiated-screen projection during projection from a mobile phone to a tablet computer. FIG. 12(A) shows a same-screen projection scenario, and the tablet computer displays screen content of the mobile phone. For example, both the tablet computer and the mobile phone display a window B.

When a user touches a button on an interface of the tablet computer, a differentiated-screen projection mode may be triggered. In this case, even if the mobile phone switches back to desktop display, the tablet computer still displays an application window $W_1$ and an application window $W_2$ that are enabled by the mobile phone and that run in a background of the mobile phone. FIG. 12(B) shows a scenario in which the differentiated-screen projection mode has been entered.

Specifically, the mobile phone may run two displays (a display 0 and a display 1). The display 0 displays original content of the mobile phone. The other display, namely, the virtual display 1, displays content of application windows (that is, the application window $W_1$ and the application window $W_2$) projected on the tablet computer. The content is invisible to the user on the mobile phone. The application windows run in the background of the mobile phone, and can be visible to the user only after the application windows are projected onto the tablet computer. An event triggered on the tablet computer is transmitted to the application windows on the display 1 of the mobile phone through a cross-device transmission channel. In the differentiated-screen projection scenario, when the user performs an operation on the mobile phone, the content displayed on the tablet computer remains unchanged; and when the user performs an operation on the content of the projected windows on the tablet computer, the content displayed on the mobile phone remains unchanged. Therefore, the content is independent of each other.

An event triggered when the user performs operations on the application window $W_1$ and the application window $W_2$ on the interface of the tablet computer is transmitted to $W_1$ and $W_2$ displayed on the display 1 in the background of the mobile phone through the cross-device transmission channel, to complete event processing. After interface content of $W_1$ and $W_2$ is refreshed in the background of the mobile phone, the interface content of $W_1$ and $W_2$ projected onto the tablet computer is refreshed.

In this application, regardless of whether same-screen projection or differentiated-screen projection is performed, all application windows displayed on the target device run on the source device. In terms of window data transmission, same-screen projection is used to directly transmit display content (the display 0) of the source device to the target device for display, while differentiated-screen projection is used to transmit, to the target device for display, display content of the display 1 run by the source device in the background. In this application, by accurately managing window data transmitted across devices, a plurality of windows enabled by the source device are simultaneously displayed on the target device, thereby extending comprehensiveness and flexibility of screen projection display. In addition, an operation is simple, and strong practicability is achieved.

An embodiment of this application further provides a computer-readable storage medium. The computer-readable storage medium stores a computer program. When the computer program is executed by a processor, the steps of the screen projection display methods provided in this application are implemented.

An embodiment of this application further provides a computer program product. When the computer program product runs on a terminal device, the terminal device is enabled to perform the steps of the screen projection display methods provided in this application.

Figure 13:
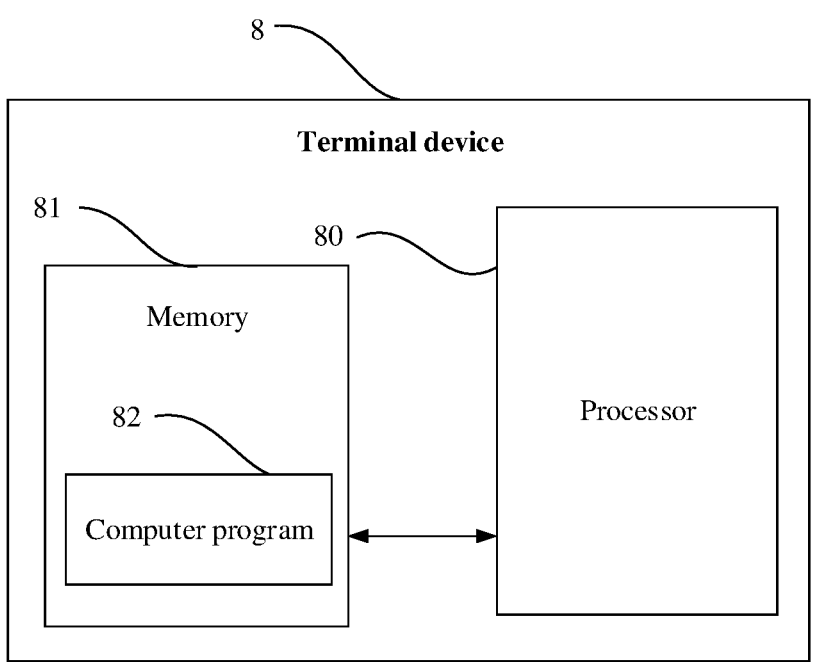
FIG. 13 is a schematic diagram of a terminal device according to an embodiment of this application.

FIG. 13 is a schematic diagram of a structure of a terminal device according to an embodiment of this application. As shown in FIG. 13, the terminal device 8 in this embodiment includes at least one processor 80 (only one processor is shown in FIG. 13), a memory 81, and a computer program 82 that is stored in the memory 81 and that may run on the at least one processor 80. When executing the computer program 82, the processor 80 implements the steps in any one of the foregoing screen projection display method embodiments.

The terminal device 8 may be a computing device such as a mobile phone, a desktop computer, a notebook computer, a palmtop computer, or a cloud server. The terminal device may include but is not limited to the processor 80 and the memory 81. Persons skilled in the art can understand that, FIG. 13 is merely an example of the terminal device 8, and does not constitute any limitation on the terminal device 8. The terminal device 8 may include components more or fewer than those shown in the figure, a combination of some components, or different components. For example, the terminal device 8 may further include an input/output device and a network access device.

The foregoing processor may be a Central Processing Unit (Central Processing Unit, CPU), or may be another general purpose processor, a Digital Signal Processor (Digital Signal Processor, DSP), an Application Specific Integrated Circuit (Application Specific Integrated Circuit, ASIC), a Field Programmable Gate Array (Field Programmable Gate Array, FPGA) or another programmable logic device, a discrete gate or transistor logic device, or a discrete hardware component. The general-purpose processor may be a microprocessor, or the processor may be any conventional processor or the like.

In some embodiments, the memory 81 may be an internal storage unit of the terminal device 8, for example, a hard disk or a memory of the terminal device 8. In some other embodiments, the memory 81 may alternatively be an external storage device of the terminal device 8, for example, a plug-in hard disk, a smart media card (Smart Media Card, SMC), a secure digital (Secure Digital, SD) card, or a flash card (Flash Card) provided on the terminal device 8. Further, the memory 81 may further include both the internal storage unit and the external storage device of the terminal device 8. The memory 81 is configured to store an operating apparatus, an application program, a boot loader (BootLoader), data, another program, and the like, for example, program code of the computer program. The memory 81 may be further configured to temporarily store data that has been output or is to be output.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. Functional units and modules in the embodiments may be integrated into one processing unit, or each of the units may exist alone physically, or two or more units may be integrated into one unit. The integrated unit may be implemented in a form of hardware or a form of a software functional unit. In addition, specific names of the functional units and modules are merely used to distinguish each other, and are not used to limit the protection scope of this application. For a specific working process of the units and modules in the foregoing apparatus, refer to a corresponding process in the foregoing method embodiments. Details are not described herein again.

In the foregoing embodiments, the description of each embodiment has respective focuses. For a part that is not described in detail in an embodiment, reference may be made to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, all or a part of the procedures in the methods in the foregoing embodiments may be implemented by using a computer program instructing related hardware. The computer program may be stored in a computer-readable storage medium. When the computer program is executed by the processor, the steps in the foregoing method embodiments may be implemented. The computer program includes computer program code, and the computer program code may be in a source code form, an object code form, an executable file, some intermediate forms, or the like. The computer-readable medium may include at least any entity or apparatus that can carry computer program code to the terminal device, a recording medium, a computer memory, a read-only memory (ROM, Read-Only Memory), a random access memory (RAM, Random Access Memory), an electrical carrier signal, a telecommunication signal, and a software distribution medium, for example, a USB flash drive, a removable hard disk, a magnetic disk, or an optical disc. In some jurisdictions, based on legislation and patent practice, the computer-readable medium may not be an electrical carrier signal or a telecommunication signal.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method, applied to a target device, wherein the method comprises:

after receiving screen projection request information sent by a source device, obtaining first window data of a first application enabled by the source device, wherein the first window data comprises display content corresponding to two windows opened in the first application enabled by the source device, wherein the two windows comprise a first window and a second window, the first window is a window that has not been displayed on the source device before the first window data is received, the second window is a window that has been displayed on the source device before the first window data is received, the second window is a window displayed on the source device when the first window data is received, and the source device does not display any content of the first window, and wherein in the first window data a window component of the first window is in an active state, a layer of the window component of the first window is in a visible state, a window component of the second window is in the active state, and a layer of the window component of the second window is in the visible state;

displaying, on the target device, a third window and a fourth window simultaneously, wherein the third window is used to display window content corresponding to the first window in a first area of a display interface of the target device and the fourth window is used to display window content corresponding to the second window in a second area of the display interface of the target device, and wherein the third window and the fourth window are user-operable windows; and in response to an operation performed on the third window, refreshing, by the target device, the displayed window content of the third window, wherein the refreshing of the displayed window content of the third window does not affect any currently displayed content of the source device; and when a fifth window opened from the third window is detected, adding the fifth window to the second area in the display interface of the target device for display, and closing the fourth window displayed in the display interface; and when a sixth window opened from the fourth window is detected, adding, for display, the sixth window to the second area in the display interface of the target device to cover the fourth window displayed in the display interface.

2. The method according to claim 1, wherein the first window data further comprises application information, window component information and window attribute information, and displaying, on the target device, the third window and the fourth window simultaneously comprises:

determining a quantity of to-be-displayed windows, and a size, a display location and a display manner of each to-be-displayed window of the to-be-displayed windows based on the application information, the window component information and the window attribute information that are comprised in the first window data; and displaying, on the target device, the third window and the fourth window simultaneously based on the quantity of to-be-displayed windows, and the size, the display location and the display manner of each to-be-displayed window.

3. The method according to claim 2, wherein after displaying, on the target device, the third window and the fourth window simultaneously, the method further comprises:

when a first instruction is detected for performing an operation on a window of the quantity of to-be-displayed windows that have been displayed, obtaining target application information and target window component information that are comprised in window data of the window; and sending the first instruction, the target application information and the target window component information to the source device, to instruct the source device to determine both a to-be-operated target application and a to-be-operated target window based on the target application information and the target window component information, and to perform an operation on the to-be-operated target window in the to-be-operated target application according to the first instruction.

4. The method according to claim 1, wherein after displaying, on the target device, the third window and the fourth window simultaneously, the method further comprises:

when detecting that a current display interface of the source device changes, keeping displaying content of the third window and the fourth window on the target device; and after detecting a second instruction for performing an operation on a created and displayed window, sending the second instruction to the source device, to instruct the source device to keep the current display interface unchanged and to perform, according to the second instruction, an operation on a corresponding window running in a background of the source device.

5. The method according to claim 1, wherein all display content of the third window and the fourth window is obtained from the first window data.

6. The method according to claim 5, wherein the first window data is automatically sent by the source device to the target device in response to the source device receiving, from the target device, an acknowledgment of the screen projection request information.

7. The method according to claim 5, wherein the source device processes the first window data to set a layer of a window component of each window in the first window data to be in a visible state.

8. A terminal device, comprising a non-transitory memory, at least one processor, and a computer program that is stored in the memory and that is executable by the at least one processor, wherein when executing the computer program, the at least one processor is configured to perform:

after receiving screen projection request information sent by a source device, obtaining first window data of a first application enabled by the source device, wherein the first window data comprises display content corresponding to two windows opened in the first application enabled by the source device, the two windows comprise a first window and a second window, the first window is a window that has not been displayed on the source device before the first window data is obtained, the second window is a window that has been displayed on the source device before the first window data is received, the second window is a window displayed on the source device when the first window data is received, and the source device does not display any content of the first window when the first window data is received, and wherein in the first window data a window component of the first window is in an active state, a layer of the window component of the first window is in a visible state, a window component of the second window is in the active state, and a layer of the window component of the second window is in the visible state;

displaying a third window and a fourth window simultaneously, wherein the third window is used to display window content corresponding to the first window in a first area of a display interface of a target device and the fourth window is used to display window content corresponding to the second window in a second area of the display interface of the target device, and wherein the third window and the fourth window are user-operable windows; and in response to an operation performed on the third window, refreshing the displayed window content of the third window, wherein the refreshing of the displayed window content of the third window does not affect any currently displayed content of the source device; and when a fifth window opened from the third window is detected, adding the fifth window to the second area in the display interface of the target device for display, and closing the fourth window displayed in the display interface; and when a sixth window opened from the fourth window is detected, adding, for display, the sixth window to the second area in the display interface of the target device to cover the fourth window displayed in the display interface.

9. The terminal device according to claim 8, wherein the first window data further comprises application information, window component information and window attribute information, and displaying the third window and the fourth window simultaneously comprises:

determining a quantity of to-be-displayed windows, and a size, a display location and a display manner of each to-be-displayed window of the to-be-displayed windows based on the application information, the window component information and the window attribute information that are comprised in the first window data; and displaying the third window and the fourth window simultaneously based on the quantity of to-be-displayed windows, and the size, the display location and the display manner of each to-be-displayed window.

10. The terminal device according to claim 8, wherein when executing the computer program, the at least one processor is configured to perform:

after displaying the third window and the fourth window simultaneously, when a first instruction is detected for performing an operation on a window of the quantity of to-be-displayed windows that have been displayed, obtaining target application information and target window component information that are comprised in window data of the window; and sending the first instruction, the target application information and the target window component information to the source device, to instruct the source device to determine both a to-be-operated target application and a to-be-operated target window based on the target application information and the target window component information, and to perform an operation on the to-be-operated target window in the to-be-operated target application according to the first instruction.

11. The terminal device according to claim 8, wherein when executing the computer program, the at least one processor is configured to perform:

after displaying the third window and the fourth window simultaneously, when detecting that a current display interface of the source device changes, keeping displaying content of the third window and the fourth window on the target device; and after detecting a second instruction for performing an operation on a created and displayed window, sending the second instruction to the source device, to instruct the source device to keep the current display interface unchanged and to perform, according to the second instruction, an operation on a corresponding window running in a background of the source device.

12. The terminal device according to claim 8, wherein all display content of the third window and the fourth window is obtained from the first window data.

13. The terminal device according to claim 12, wherein the first window data is automatically sent by the source device to the target device in response to the source device receiving, from the target device, an acknowledgment of the screen projection request information.

14. The terminal device according to claim 12, wherein the source device processes the first window data to set a layer of a window component of each window in the first window data to be in a visible state.

15. A method, applied to a system comprising a source device and a target device, the method comprising:

sending, by the source device, first window data of a first application enabled by the source device, wherein the first window data comprises display content corresponding to two windows opened in the first application enabled by the source device, the two windows comprise a first window and a second window, the first window is a window that has not been displayed on the source device before the first window data is sent, and the second window is a window that has been displayed on the source device before the first window data is sent, the second window is a window displayed on the source device when the first window data is received, and the source device does not display any content of the first window when the first window data is received, wherein in the first window data a window component of the first window is in an active state, a layer of the window component of the first window is in a visible state, a window component of the second window is in the active state, and a layer of the window component of the second window is in the visible state; and receiving, by the target device, the first window data, and displaying a third window and a fourth window simultaneously, wherein the third window is used to display window content corresponding to the first window in a first area of a display interface of the target device and the fourth window is used to display window content corresponding to the second window in a second area of the display interface of the target device, and wherein the third window and the fourth window are user-operable windows; and in response to an operation performed on the third window, refreshing, by the target device, the displayed window content of the third window, wherein the refreshing of the displayed window content of the third window does not affect any currently displayed content of the source device; and when a fifth window opened from the third window is detected, adding, by the target device, the fifth window to the second area in the display interface of the target device for display, and closing the fourth window displayed in the display interface; and when a sixth window opened from the fourth window is detected, adding, for display by the target device, the sixth window to the second area in the display interface of the target device to cover the fourth window displayed in the display interface.

16. The method according to claim 15, wherein the first window data further comprises application information, window component information and window attribute information, and displaying the third window and the fourth window simultaneously comprises:

determining a quantity of to-be-displayed windows, and a size, a display location and a display manner of each to-be-displayed window of the to-be-displayed windows based on the application information, the window component information and the window attribute information that are comprised in the first window data; and displaying the third window and the fourth window simultaneously based on the quantity of to-be-displayed windows, and the size, the display location and the display manner of each to-be-displayed window.

17. The method according to claim 15, further comprising:

after displaying the third window and the fourth window simultaneously, when a first instruction is detected for performing an operation on a window of the quantity of to-be-displayed windows that have been displayed, obtaining, by the target device, target application information and target window component information that are comprised in window data of the window; and sending the first instruction, the target application information and the target window component information to the source device, to instruct the source device to determine both a to-be-operated target application and a to-be-operated target window based on the target application information and the target window component information, and to perform an operation on the to-be-operated target window in the to-be-operated target application according to the first instruction.

18. The method according to claim 15, further comprising:

after displaying the third window and the fourth window simultaneously, when detecting that a current display interface of the source device changes, keeping displaying content of the third window and the fourth window on the target device; and after detecting a second instruction for performing an operation on a created and displayed window, sending, by the target device, the second instruction to the source device, to instruct the source device to keep the current display interface unchanged and to perform, according to the second instruction, an operation on a corresponding window running in a background of the source device.

19. The method according to claim 15, wherein all display content of the third window and the fourth window is obtained from the first window data.

20. The method according to claim 15, wherein the first window data is automatically sent by the source device to the target device in response to the source device receiving, from the target device, an acknowledgment of screen projection request information.

* * * * *